Jan. 8, 1946.  E. H. THOMPSON ET AL  2,392,511
COOKING AND VENDING MACHINE
Filed Jan. 20, 1943  14 Sheets-Sheet 1
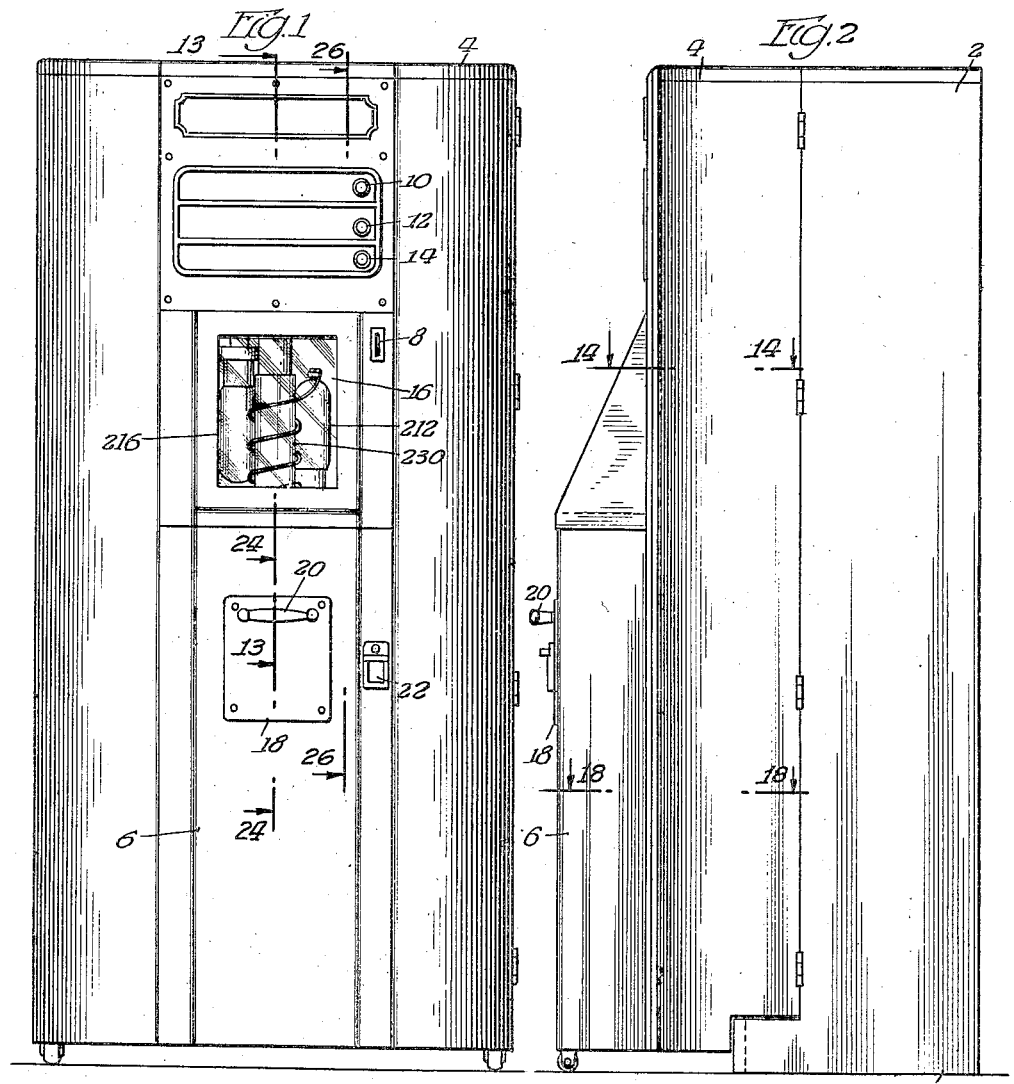
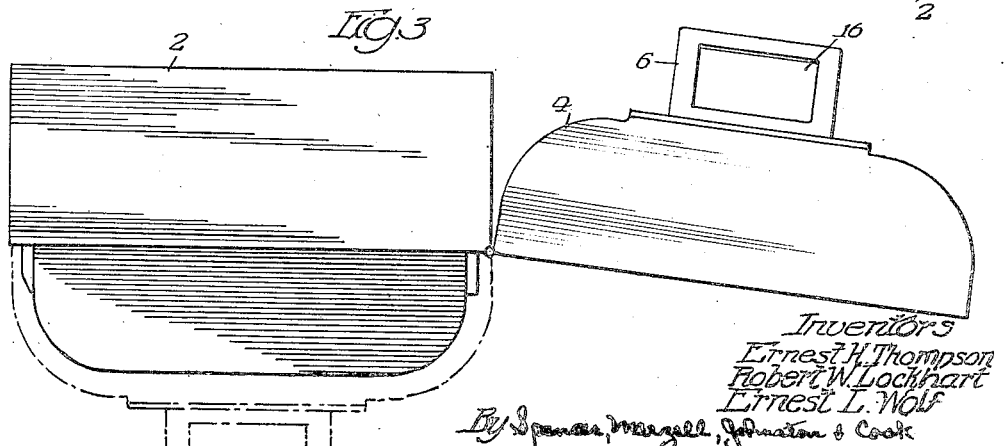

Jan. 8, 1946.  E. H. THOMPSON ET AL  2,392,511
COOKING AND VENDING MACHINE
Filed Jan. 20, 1943   14 Sheets-Sheet 2
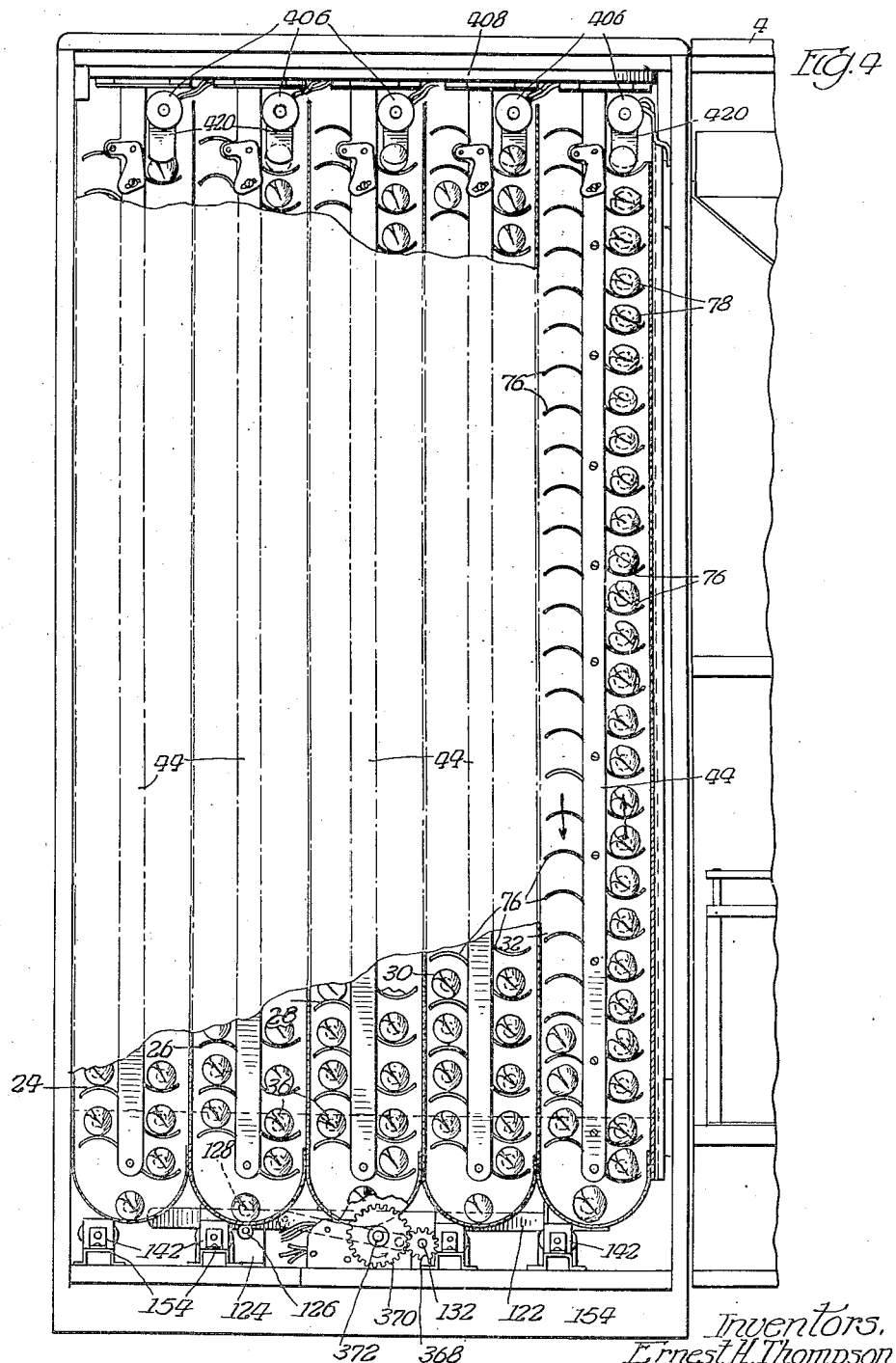
Inventors,
Ernest H. Thompson
Robert W. Lockhart
Ernest L. Wolf
By Spencer, Marzall, Johnston & Cook  Attys Jan. 8, 1946.  E. H. THOMPSON ET AL  2,392,511
COOKING AND VENDING MACHINE
Filed Jan. 20, 1943  14 Sheets-Sheet 3

Inventors
Ernest H. Thompson,
Robert W. Lockhart,
Ernest L. Wolf
By Spencer, Maryall, Johnston & Cooks
Atty.

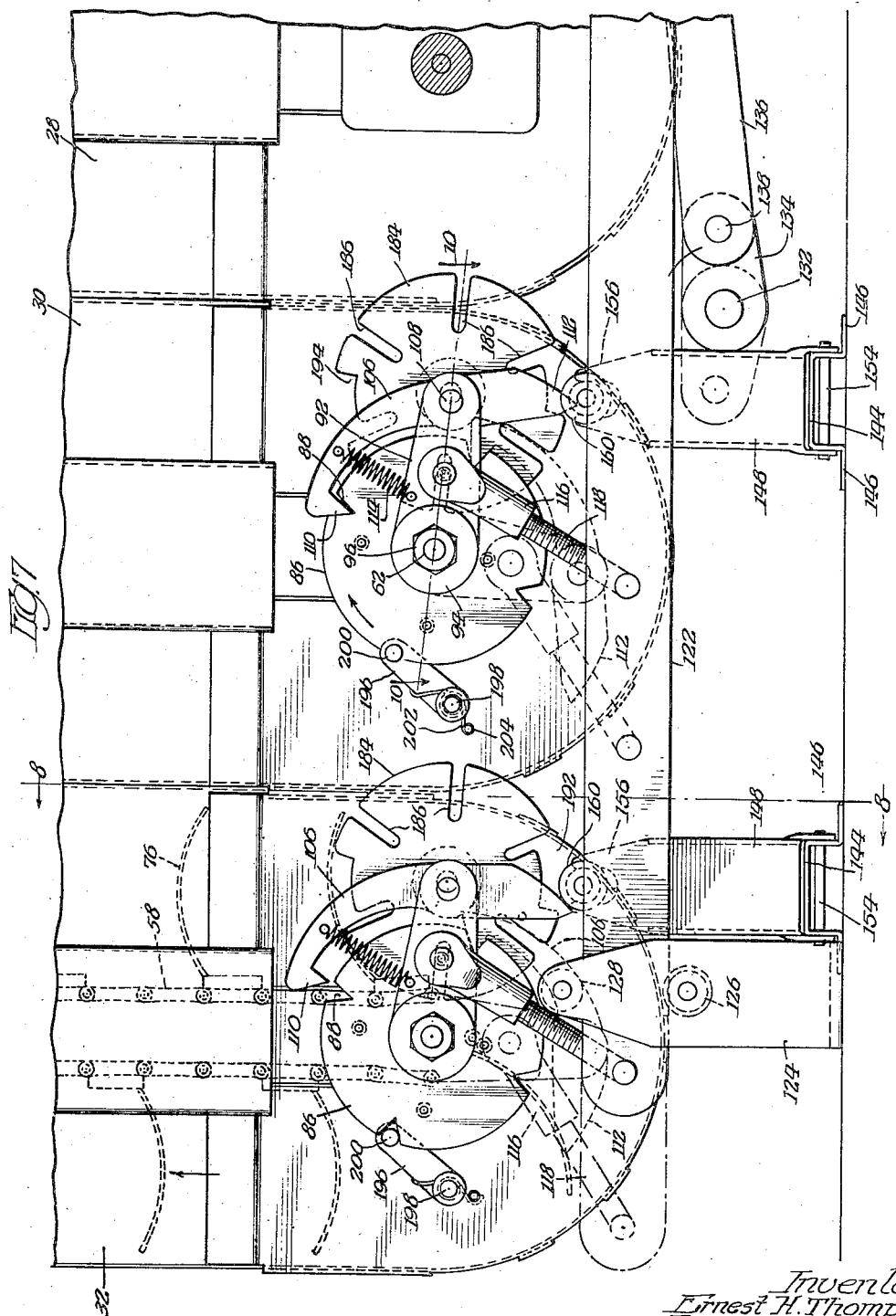

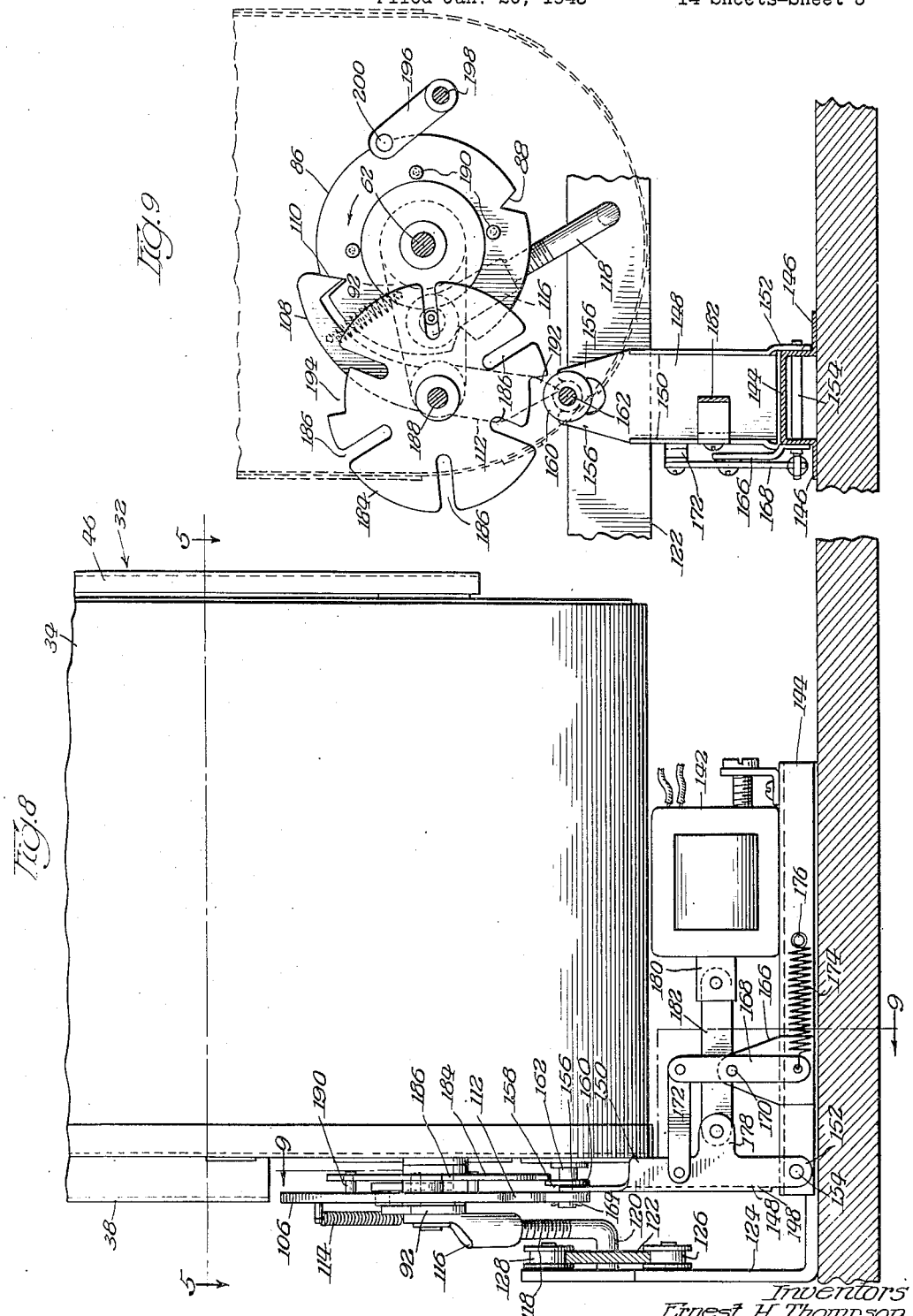

Jan. 8, 1946.  E. H. THOMPSON ET AL  2,392,511
COOKING AND VENDING MACHINE
Filed Jan. 20, 1943   14 Sheets-Sheet 6
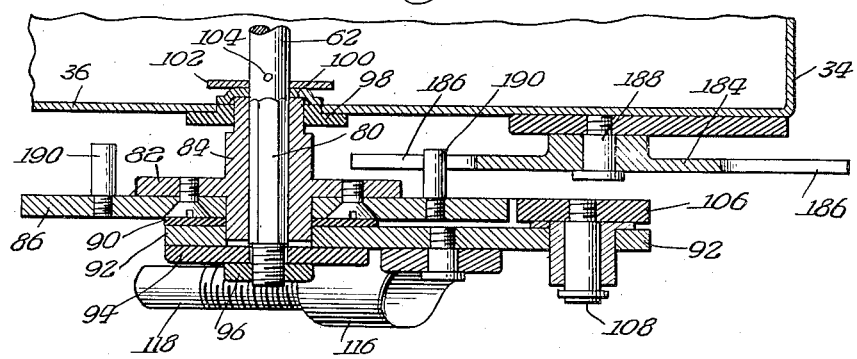
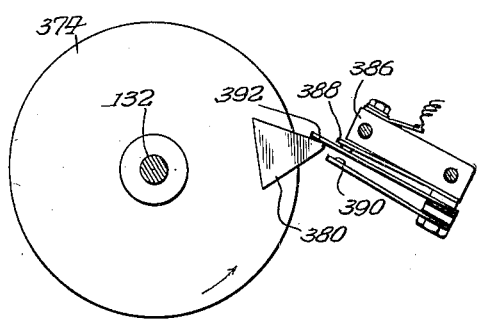
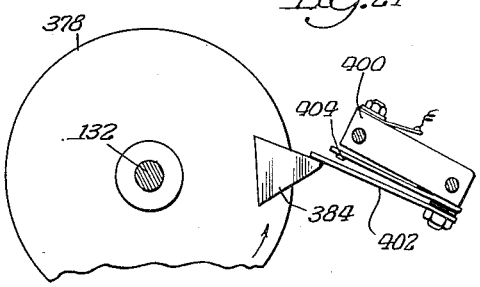
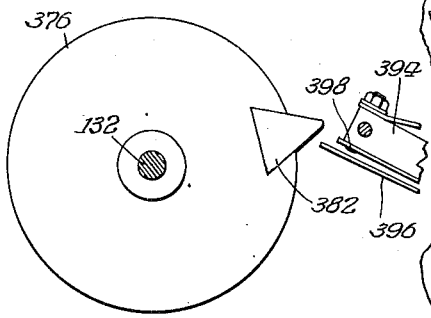
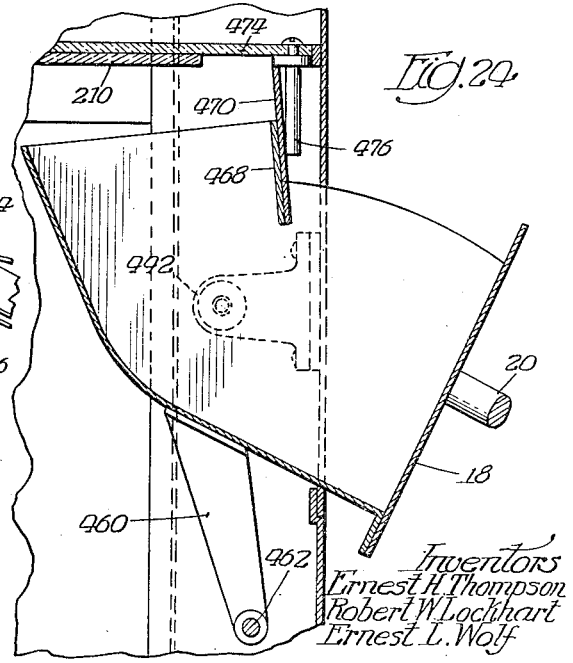
Inventors
Ernest H. Thompson
Robert W. Lockhart
Ernest L. Wolf
By Spencer, Maryall, Johnston & Cook  Attys

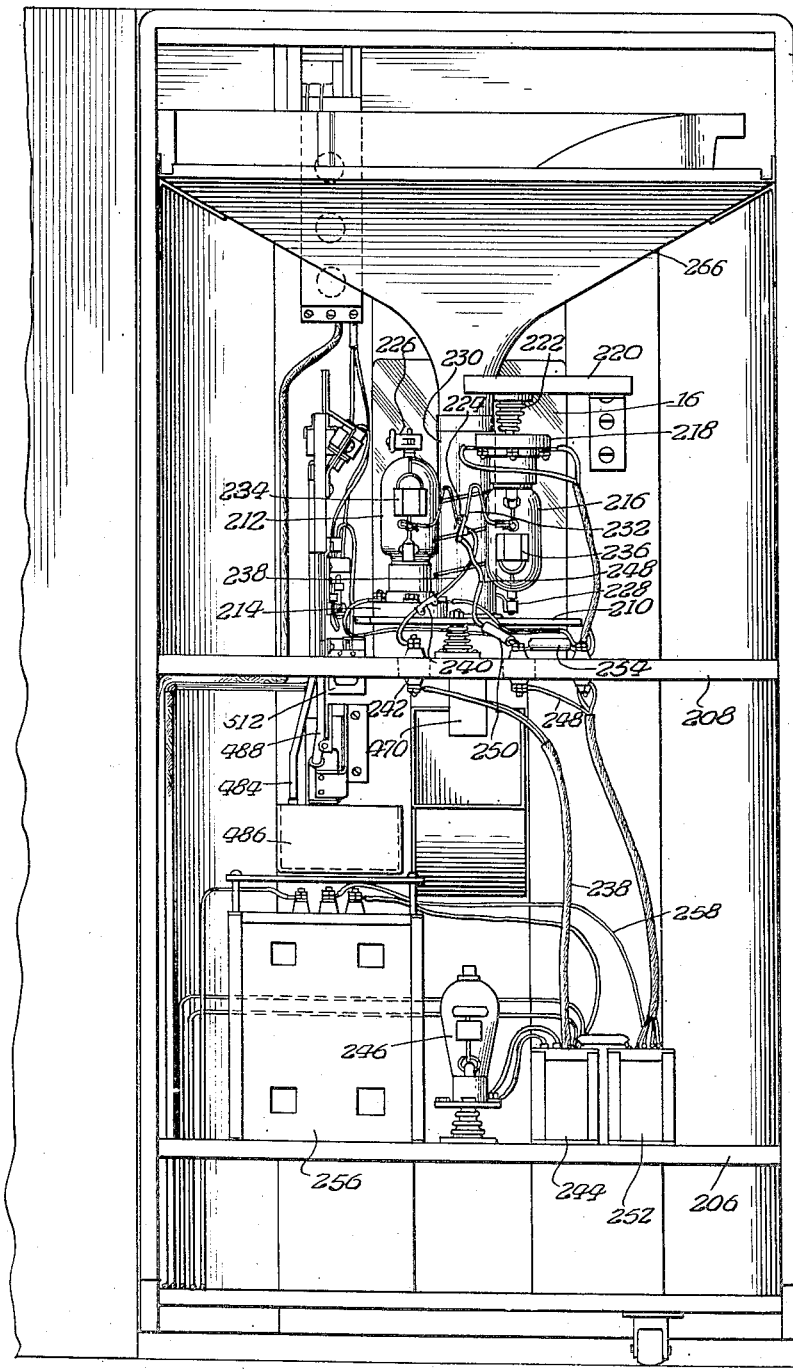

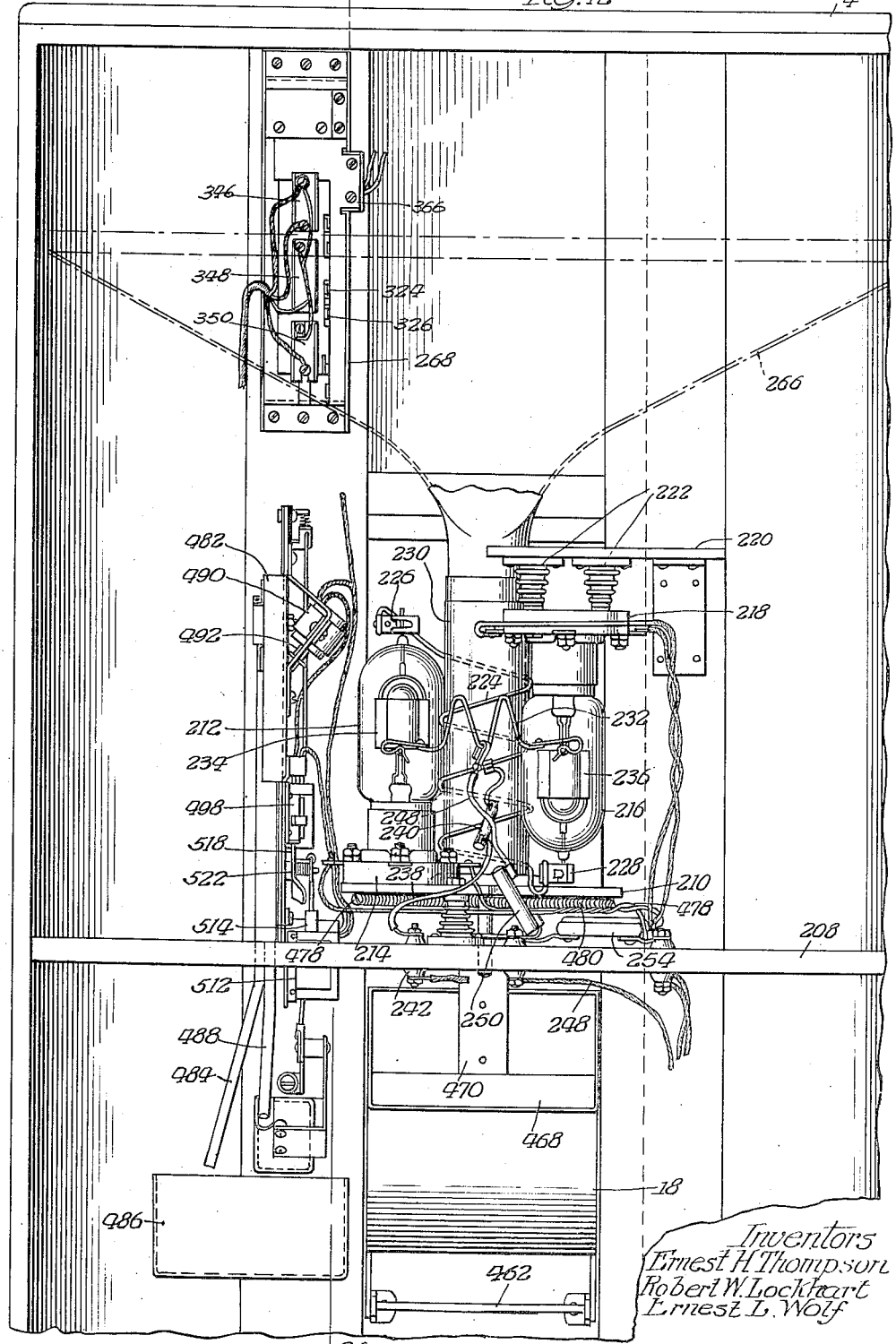

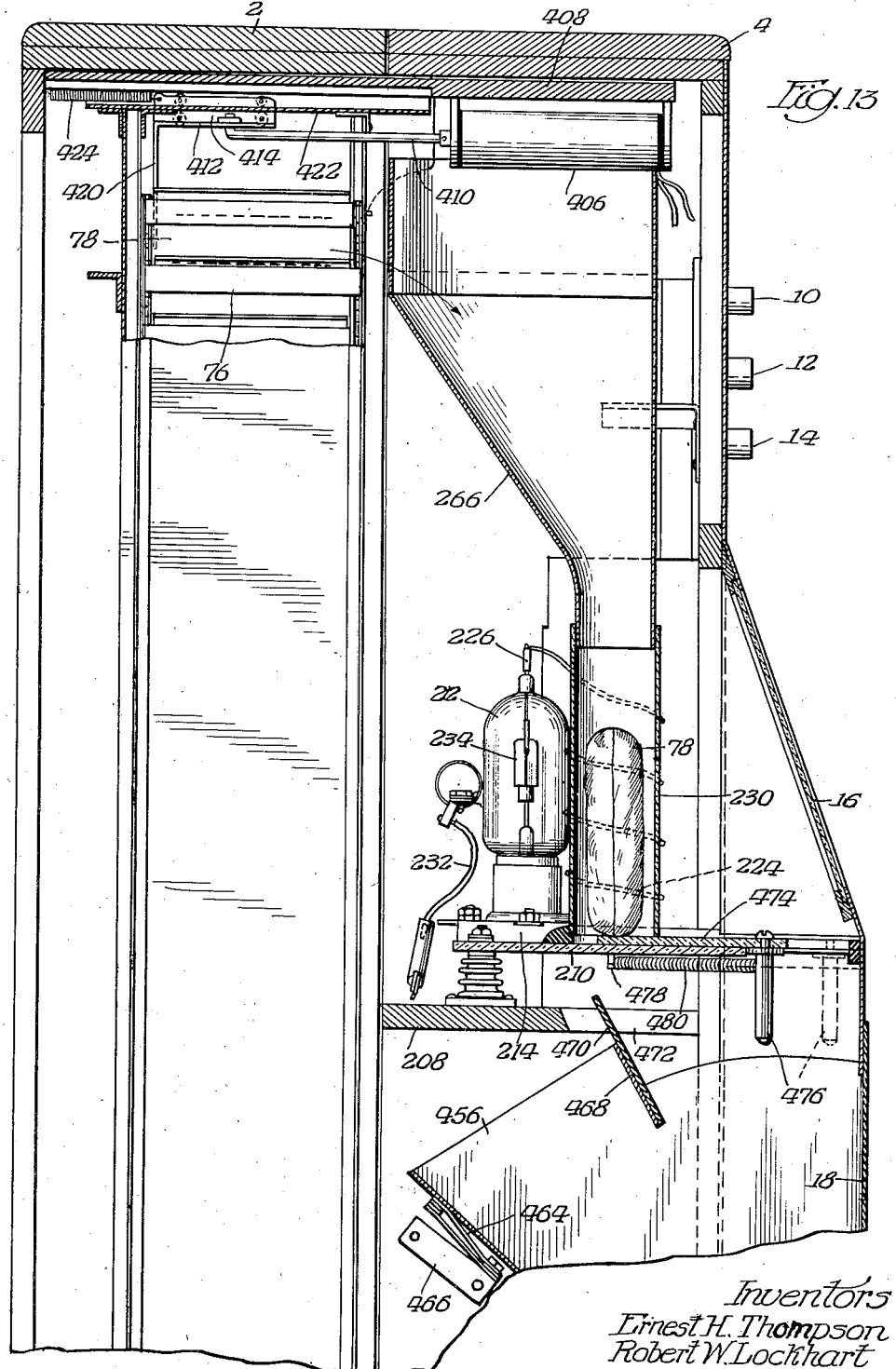

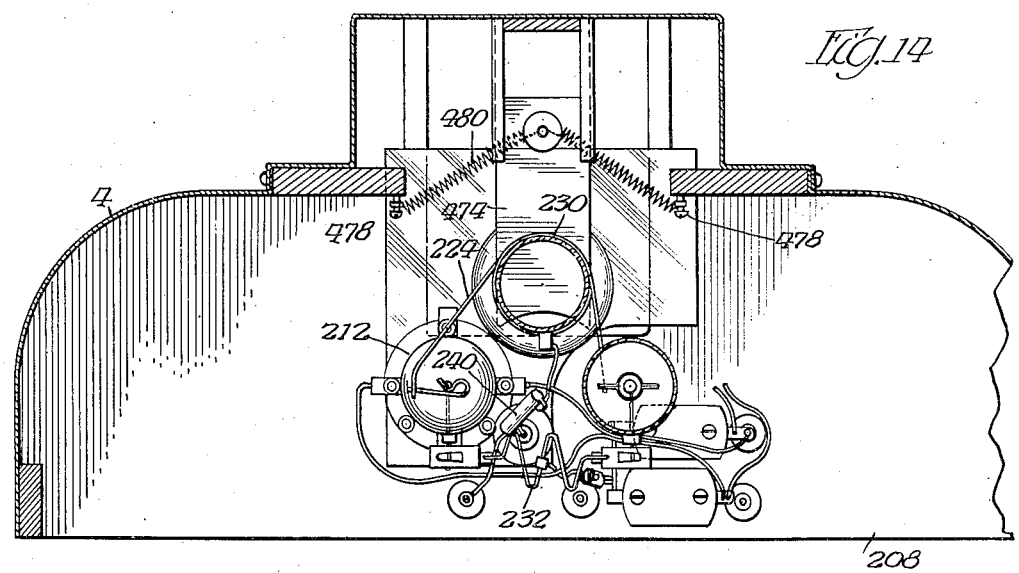
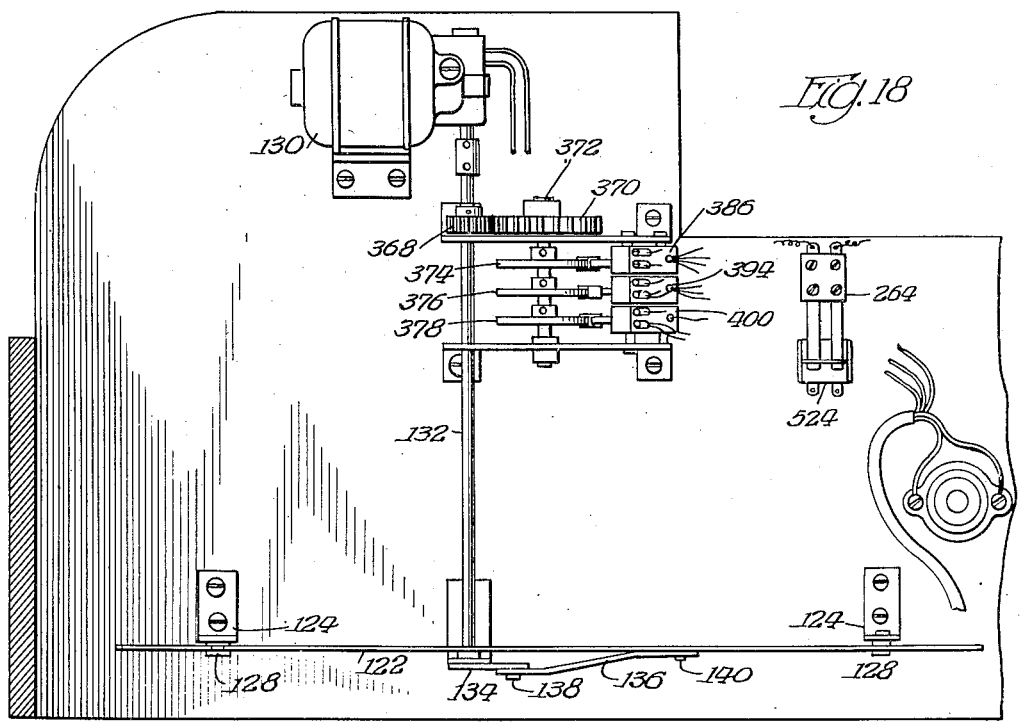

Jan. 8, 1946.  E. H. THOMPSON ET AL  2,392,511
COOKING AND VENDING MACHINE
Filed Jan. 20, 1943  14 Sheets-Sheet 11
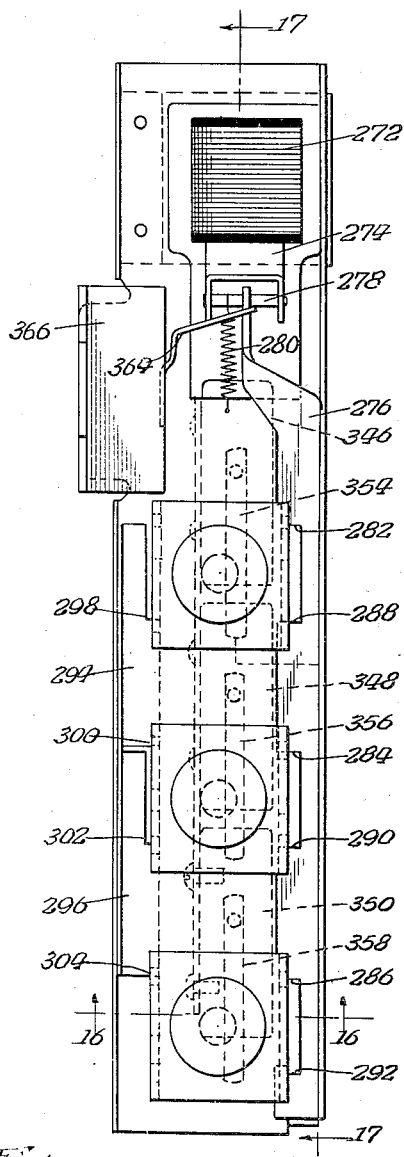
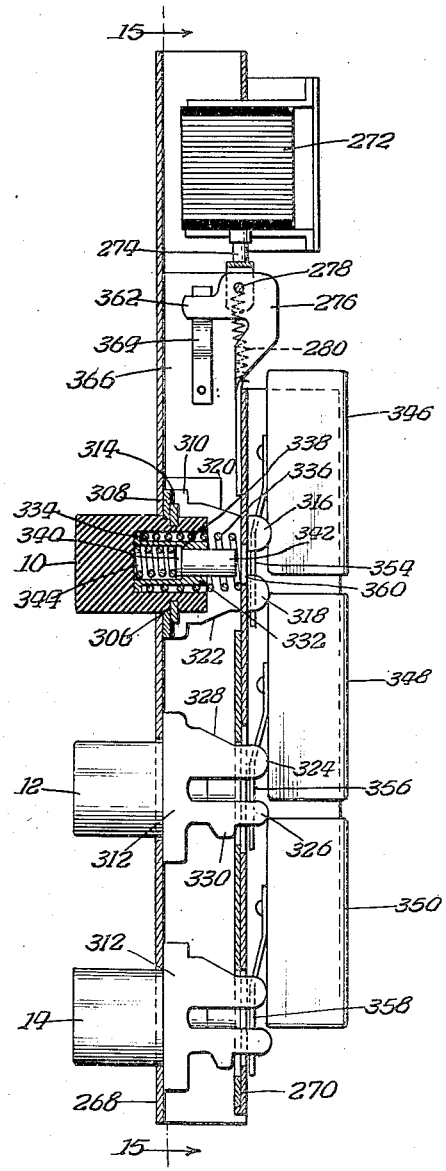
Inventors
Ernest H. Thompson
Robert W. Lockhart
Ernest L. Wolf
By Spencer, Maryall, Johnston & Cook
Atty's Jan. 8, 1946. E. H. THOMPSON ET AL 2,392,511
COOKING AND VENDING MACHINE
Filed Jan. 20, 1943 14 Sheets-Sheet 12
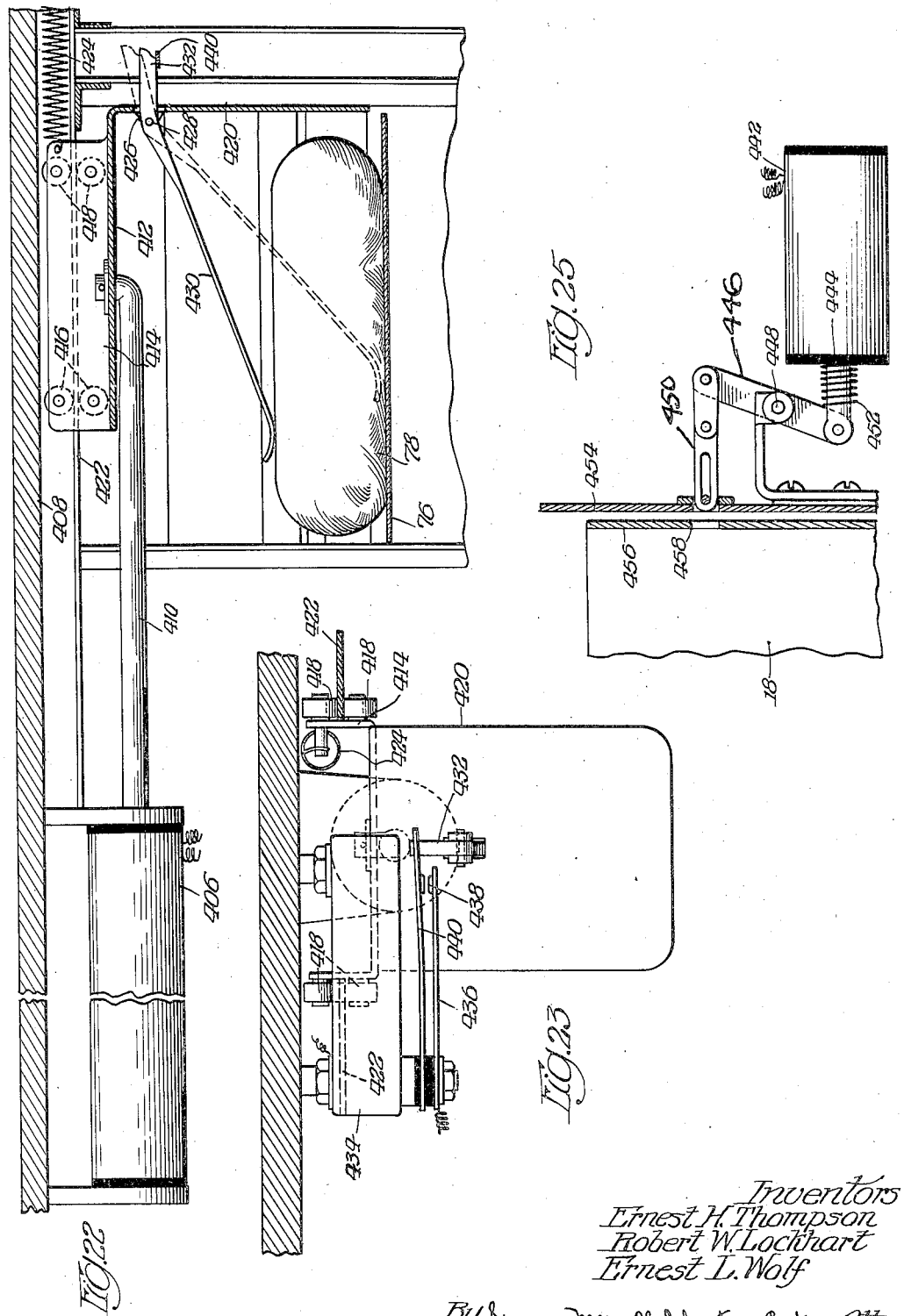
Inventors
Ernest H. Thompson
Robert W. Lockhart
Ernest L. Wolf
By Spencer, Marzall, Johnston & Cook Atty

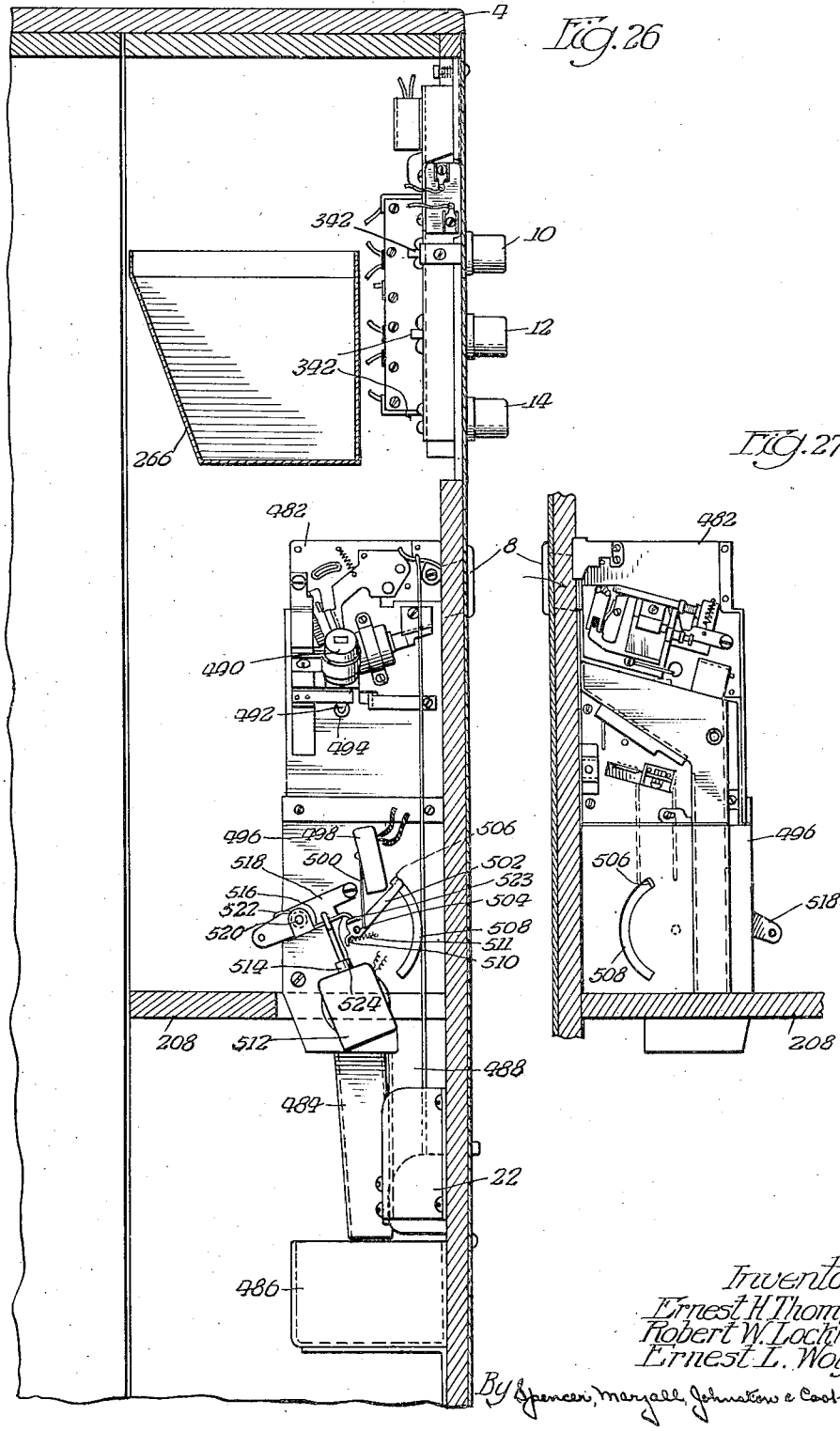

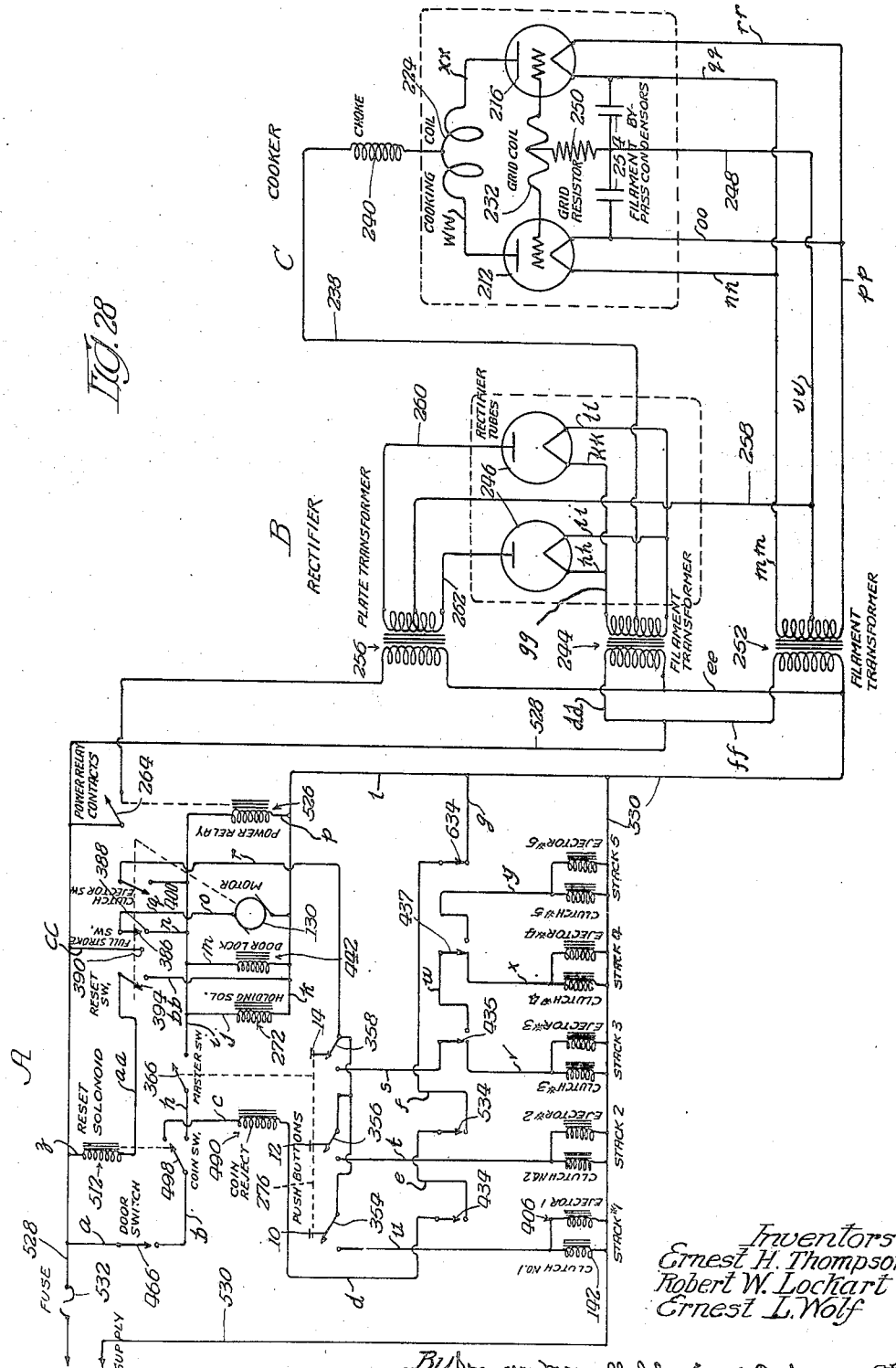

Patented Jan. 8, 1946

2,392,511

UNITED STATES PATENT OFFICE 2,392,511

COOKING AND VENDING MACHINE

Ernest H. Thompson, Winnetka, and Robert W. Lockhart and Ernest L. Wolf, Chicago, Ill., assignors to Automatic Canteen Company of America, Chicago, Ill., a corporation of Delaware Application January 20, 1943, Serial No. 472,948

28 Claims. (Cl. 99—357)

This invention relates in general to cooking and vending machines, preferably coin operated, and more particularly to a machine for automatically cooking and vending food articles, such as frankfurters and the like.

While it is contemplated that the machine disclosed herein can be used for the cooking and vending of various food products, the invention has been disclosed as particularly adapted for use in cooking and vending frankfurter sandwiches.

Briefly, the invention resides in providing one or more stacks of food articles, one of which will be removed from a stack upon the deposit of an acceptable coin, and directed to a cooking unit or assembly, where it will be thoroughly heated or cooked, and then dispensed. In machines of this character heretofore known it was customary to cook the food article by passing an electric current therethrough. However, this method, which might be called resistance cooking, has left much to be desired. The means which we use for thoroughly cooking the entire frankfurter within the sandwich in a very short period of time involves the use of high frequency oscillation of a field which induces the flow of electrons in a medium to be cooked.

In vending machines of this type it is highly desirable that the food product be cooked thoroughly in as short a period as possible. By the use of oscillations of a relatively high frequency we have been able to thoroughly heat or cook frankfurter sandwiches in a very short time. Our machine has been so designed as to support a plurality of stacks of food articles so that up to 250 or 300 sandwiches may be placed in the machine at one time, when fully loaded. Each magazine is adapted to support 50 or more sandwiches and means are provided to advance the stack from which a sandwich has been ejected and deposited in the cooking assembly, so that by the end of the cooking period the stack will have advanced the next successive sandwich to a position where it may next be ejected.

One of the objects of our invention is to provide a machine for automatically thoroughly cooking and dispensing a food article upon depositing an acceptable coin.

Another object of the invention is to provide a machine of compact design capable of giving a patron a relatively great variety of brands or types of food articles from which to choose.

A further object of the invention is to provide a compact cooking assembly operating on high frequency oscillations capable of thoroughly cooking the food article in the shortest possible time.

Another object of the invention is to so arrange the various mechanisms that the magazines are located in the back of the cabinet and the cooking assembly can be mounted on the inside of the door so that access to either may be had when the door is open.

Still another object of the invention is the provision of novel means for ejecting a food article from a stack, delivering it to a cooking assembly, and advancing the stack so that the next successive food article is in a position to be ejected.

A still further object of the invention is to provide a plurality of stacks of food articles of different types or brands wherein there may be two or more stacks of the same type or brand, and to further provide means for automatically switching the operating mechanism to another stack when the first is empty. In order to explain this further, in the particular embodiment of the invention disclosed herein we have shown five magazines capable of supporting five separate stacks of food articles, and particularly frankfurter sandwiches. It may be necessary, in order to satisfy the desires of a great number of patrons, to provide, for example, one stack of kosher frankfurters, two or three stacks of ordinary frankfurters of one particular brand and one or two stacks of still a different brand. Supposing there are three stacks of the same brand; in this case we have provided means so that instead of locking the machine after the first or second of these stacks has been depleted, after depletion of the first stack the mechanism will be automatically switched to the second stack and after depletion of the second, the operating mechanism will be automatically switched to the third. It will, of course, be obvious that this can be carried on for as many stacks as desired but for purpose of illustration in the present case, we have shown in the wiring diagram means for operating three stacks containing the same brand and each of the other two stacks containing different brands or types. The number of stacks of any one kind will vary according to the location of the machine, and experience will dictate the best combination.

Still another object of the invention is the provision of a plurality of electric circuits which will be energized upon depositing a coin and operating a push-button to actuate a motive means whereby the cooking and certain other operations may be completed during a predetermined time interval.

A further object of the invention is the provision of means for removing the food article from the cooking assembly after it has been thoroughly cooked, but preventing removal thereof until the cooking process has been completed.

A still further object of the invention is to provide means for causing the return of a deposited coin to the patron either during the operation of the machine or when a stack becomes empty.

Other objects and advantages of the invention will become apparent upon a reading of the following description taken in connection with the accompanying drawings wherein:

Fig. 1 is a front elevational view of the entire machine;

Fig. 2 is a side elevational view thereof;

Fig. 3 is a top plan view of the machine showing the door in wide open position;

Fig. 4 is a front elevational view of the cabinet with the door wide open showing the magazines and stacks of food articles located therein;

Fig. 5 is a horizontal section of a single stack taken substantially along the plane of line 5—5 of Fig. 8;

Fig. 6 is a fragmentary vertical section of a single stack taken substantially along the plane of line 6—6 of Fig. 5;

Fig. 7 is a fragmentary enlarged elevation looking forwardly from the rear of the machine at the bottom of the stacks;

Fig. 8 is a fragmentary side elevational view of one of the stacks and is taken along the plane of line 8—8 of Fig. 7;

Fig. 9 is a sectional view taken substantially along the plane of line 9—9 of Fig. 8;

Fig. 10 is an enlarged section of one of the stack advancing mechanisms taken substantially along the plane of line 10—10 of Fig. 7;

Fig. 11 is a front elevational view of the door in its wide open position showing the coin mechanism and cooking assembly mounted therein;

Fig. 12 is a fragmentary enlarged elevation of the upper portion of the mechanism shown in Fig. 11;

Fig. 13 is a fragmentary vertical section from front to rear through the machine when the door is closed showing the ejector solenoid and the cooking assembly;

Fig. 14 is a horizontal section through the door showing the cooking assembly in plan;

Fig. 15 is a vertical transverse section of the push-button assembly taken substantially along the plane of line 15—15 of Fig. 17;

Fig. 16 is a horizontal section through the push-button assembly taken substantially along the plane of line 16—16 of Fig. 15;

Fig. 17 is a vertical transverse section through the push-button assembly taken substantially along the plane of line 17—17 of Fig. 15;

Fig. 18 is a horizontal section through the main compartment of the cabinet showing in plan the motor and the various switches operated thereby;

Figs. 19, 20, and 21 are enlarged side elevational views of the full stroke switch, reset switch, and the clutch and ejector switch, respectively, showing also the camming elements which operate them, which camming elements are actuated by the motor as shown in Fig. 18;

Fig. 22 is a fragmentary enlarged side elevation of the upper part of the machine showing the ejector solenoid and the empty lock switch, one of which is located in the top of each stack;

Fig. 23 is an end elevation of the empty lock switch and ejector means of Fig. 22;

Fig. 24 is an enlarged fragmentary section through the front of the machine showing the door in open position;

Fig. 25 is an elevational view of the door lock solenoid;

Fig. 26 is an enlarged vertical section through the front of the machine showing the push-button assembly and the coin mechanism in side elevation;

Fig. 27 is an elevational view showing the side of the coin mechanism opposite to that shown in Fig. 26; and, Fig. 28 is a wiring diagram showing the various switches and solenoids, as well as the high frequency cooking assembly, and the mechanical connections between certain of the switches diagrammatically.

The machine as disclosed herein includes a main compartment and a door. The various magazines are mounted in the main compartment at the rear and the various elements which comprise the cooking unit are mounted on the inside of the door, so that upon opening the door a service man will have easy access to all the mechanism to facilitate repair and replacement of the various parts. Also, when the door is open the magazines will be exposed for reloading.

In order that a general understanding may be had as to the operation of the machine prior to a discussion of the details, it may be stated that the cooking circuit which operates on high frequency current is connected across the lines in parallel with the main electric circuit. Energization of the main circuit operates to close a switch and energize the cooking circuit. It is desirable in the present embodiment that three switches be closed before the main circuit will be energized, namely, a door switch, a coin switch, and a master switch. The door switch is normally closed when the door is closed and is opened upon opening the door, so that the machine cannot be operated when the door is in this position. The coin switch closes upon depositing an acceptable coin. The master switch is closed by operating one of the push-buttons. The main circuit and the cooking circuit are then energized. As soon as the main circuit is energized an ejector solenoid is actuated to eject a food article, such as a frankfurter sandwich, from the selected stack and deposit it into the cooking assembly. Simultaneously with this action, a clutch solenoid is energized and the motor starts in order to advance the selected stack to a position where the next successive sandwich may be ejected. The clutch solenoid, when in its normal extended position, prevents operation of the stack advancing means but is momentarily energized to permit action thereof. One ejector solenoid and one clutch solenoid is provided for each stack. Means are provided to maintain the motor in operation for a predetermined period of time, at the end of which time all electric circuits are opened and the machine ceases operation. The period of operation is sufficient to insure thorough cooking of the food article. After the article is cooked and the machine is stopped, a door lock solenoid which has been energized to prevent opening the door during operation of the machine is then de-energized, at which time the door may be opened to permit the cooked sandwich to drop downwardly where the patron has access to it.

As has been stated hereinbefore, one of the features of our invention is the provision of a plurality of magazines to support a number of stacks of food articles of different types or brands. The particular number used is not important and, although five stacks have been shown in the present embodiment, it is to be understood that the number of these stacks may be varied without in any way departing from the spirit of the invention.

In order to clarify the following description it has been divided into eight main subjects which may be listed as follows:

1. The stack advancing means (shown in Figs. 4 to 10).
2. The cooking assembly (Figs. 11, 12, 13, and 14).
3. The push-button assembly (Figs. 15, 16, and 17, also 12 and 26).
4. The motor operated switches (Figs. 18, 19, 20, and 21).
5. The ejector solenoid and the empty lock (Figs. 22 and 23).
6. The door lock and door switch (Figs. 24 and 25).
7. The coin mchanism and coin switch (Figs. 26 and 27).
8. The electric circuit (Fig. 28).

Referring now more particularly to the drawings, and especially to Figs. 1, 2 and 3, the cabinet as shown comprises a main body portion 2 at the rear thereof and a door 4 hingedly connected to the rear compartment. The storage magazines are located at the rear of the machine in the portion indicated at 2, while the cooking assembly is located within the door 4. The door itself is provided in front with a central protruding portion 6, although this portion may not be necessary, depending upon the arrangement of the mechanism within the cabinet.

A coin slot 8 is located in the door and in the particular embodiment of the invention disclosed herein we have provided three push-buttons 10, 12 and 14. Here, again, the specific number of push-buttons may be varied without departing in any way from the spirit of the invention. The number of push-buttons present indicates the variety from which the patron may choose. In the upper part of the protruding section 6 of the door may be located a transparent panel 16 through which may be viewed a portion of the cooking assembly, so that a patron may see the food article as it is actually being cooked. A small door 18 having a handle 20 is also provided in the cabinet door at the front of the machine, so that after the article has been cooked and the machine has ceased operation the small door may be opened and access had to the cooked article. Also, in the cabinet there is provided an opening 22 where access may be had to returned coins. Coins may be returned either when they are not acceptable or while the machine is operating or when one or more of the stacks are empty.

The stack advancing means

Referring now particularly to Figs. 4 to 10 inclusive, these figures disclose the details of the mechanism for advancing a selected stack of food articles as soon as an article has been removed therefrom to be cooked and dispensed. While various means may be provided to effect this result, it will be clear that the specific means disclosed herein, and about to be described, are merely illustrative.

In the embodiment shown we have provided five separate magazines for supporting stacks of food articles to be cooked and dispensed. The arrangement of these magazines may be viewed in Fig. 4 and are indicated by the numerals 24, 26, 28, 30, and 32, respectively. Since all of the magazines are alike, a description of one will suffice for all of them.

Referring now particularly to Figs. 5 and 6, it will be observed that each magazine is provided with vertically extending side wall portions 34 and terminate in closed end portions at the top and bottom. At the rear of each magazine a plate 36 is located having a vertically extending, centrally located offset portion 38. Within the plate 36 at the rear of each magazine, a vertically extending channel member 40 is located, which is provided at each longitudinal edge thereof with inwardly extending legs 42. A similar channel 44 is located at the front side of each magazine which is provided with inwardly extending legs 46. A centrally disposed channel member having a web portion 48 extends between the front and rear channel members 44 and 40 and also extends substantially throughout the length of the magazine. One side of the central channel member 48 is provided with a leg portion 50 secured to the channel member 40 and terminates in an inwardly extending flange 52. At the front side of the magazine the channel 48 is provided with a leg portion 54 which may be secured to the channel 44 and terminates in an inwardly extending flange 56.

At the rear of the magazine it will be observed that a space is provided between one of the legs 42 and the web 48 at one side and between the other leg 42 and the flange 52 at the other side. These spaces provide tracks within which a chain 58 rides. At the front of the magazine a similar chain 60 is provided which likewise rides in the spaces provided between one leg 46 and the flange 56 at one side and between the leg 46 and the web 48 at the other side.

Adjacent the bottom of the magazine a shaft 62 is suitably mounted for rotation, which shaft is provided at each end thereof with a wheel or disc 64 having a plurality of spaced apart notches 66 in the periphery thereof. A similar arrangement is provided at the top of each magazine where a shaft 68 is located and has mounted thereon at each end a disc 70 provided with a plurality of spaced apart notches 72. It will be clear that the pintles between the links of each chain will be received within the notches of the respective discs 64 and 70 so that when the shaft 62 is rotated the discs 64 will rotate and cause the chain to advance.

At spaced apart points throughout the length of each chain, and in the present instance every third link, there is mounted a supporting member 74 which has extending outwardly therefrom a shelf 76 adapted to support a frankfurter sandwich or other suitable food article 78. It will be noted that in Fig. 4 the movement of each stack is such that the right hand side moves upwardly as the left hand side moves downwardly, but since Figs. 6 and 7 view the magazines from the rear, this movement will appear reversed, so that the left hand side of the stack will move upwardly as the right hand side moves downwardly.

The arrangement of the mechanism which actually causes the shaft 62 to rotate and advance the stack, may best be seen by viewing Figs. 7 and 10, although this same mechanism is shown in plan in Fig. 5 and in side elevation in Fig. 8. Fig. 9 shows this same mechanism looking toward the back of the machine on the section line of 9—9 in Fig. 8. Although the various discs, and the like, may be secured to shaft 62 by any desired means, in the illustrative embodiment we have shown in Fig. 10 a portion of the rear end of the shaft 62 polygonal in cross-section, as indicated at 80. A disc 82 having a hub 84 extending outwardly from each side thereof is mounted on the portion 80 of the shaft 62, so that when rotation of the disc 82 is effected it will cause a rotation of the shaft 62 on which is it mounted. A ratchet wheel 86, provided with a plurality of spaced apart notches 88 in its periphery, is mounted on the hub of the disc 82 and is secured to the disc by any suitable means, such as screws. Rearwardly of the ratchet wheel 86 a spacer plate 90 is mounted on the hub 84 of the disc 82, and rearwardly of the plate 90 an arm 92 is mounted also on the hub 84, which arm extends laterally for a distance beyond the periphery of the ratchet wheel 86, as clearly shown in Fig. 7. A washer 94 is then placed against the arm 92 and over the end of the shaft 62 and the various parts are held in place by means of the nut 96 which threadedly engages the rear end of the shaft 62.

This shaft extends through an opening in plate 36 and is journaled therein by means of a disc 98 having a shoulder thereon which has a snug fit within the opening. Members 100 and 102 are parts of chain sprocket 66 (Fig. 6) which is keyed to shaft 62 by pin 104.

A pawl 106 is pivotally mounted between its ends on the outer end of the arm 92 by means of a pivot pin 108. The upper end of the pawl is provided with a projection 110 which is adapted to be received in one of the notches 88, but is normally held out of engagement therewith. The lower end of the pawl is provided with a tail piece 112 which has a camming surface thereon which bears against a member, presently to be described, in its normal inoperative position, for holding the projection 110 out of engagement with the notches in ratchet wheel 86. When free to do so a tension spring 114, by means of its connection between the upper end of the pawl and the arm 92, will urge the upper end of the pawl downwardly so that the projection 110 will engage one of the notches 88.

Thus far it will be clear that if the arm 92 is caused to rotate in a clockwise direction and the pawl is free to engage the ratchet wheel 86, such a movement will cause a clockwise rotation of the ratchet wheel in Fig. 5 (or counter-clockwise in Fig. 9) and the shaft 62 through the connection of the wheel to the disc 82. Such movement of the arm 92 is accomplished by means of a link 116 which is pivotally connected at its upper end to the arm 92 and which has a screw threaded connection with another link 118. This connection is for the purpose of adjustment. The lower end of link arm 118 is bent rearwardly as at 120 and is received in an opening in a longitudinally reciprocating bar 122. At this time we may state that each time the bar 122 reciprocates, a rotative movement will be imparted to the arm 92 and the pawl 106 secured thereto on every one of the magazines. However, since the pawls are all out of engagement with the ratchet wheels in their normal position, the only pawl permitted to engage a ratchet wheel is the one which is selected by the patron, depending upon the particular push-button actuated, so that while the pawl of each magazine will be moved, only one ratchet wheel will be caused to rotate.

It has been noted heretofore that in this illustrative embodiment of the invention, each of the shelves 76 is mounted on every third link of the chains 58 and 60. It follows then, that in order to advance a stack far enough so that the next successive article will be in a position to be ejected, it will have to be moved a distance of three links. The length of stroke of the reciprocating bar 122 is such that one reciprocation thereof will rotate the ratchet wheel one notch and consequently will move the chains only one link; therefore, to move the chains three links it is necessary to reciprocate the bar 122 three times. This particular feature, of course, may be varied, depending upon the distance through which it is necessary to move the chains for each cycle of the machine and may be varied to meet particular needs without departing in any way from the spirit of the invention.

The bar 122 is located at the rear of the machine and is supported by means of a plurality of upwardly extending brackets 124. In the present instance two of such brackets are disclosed. These brackets support vertically spaced apart rollers 126 and 128, each of which is provided with an annular groove to receive the upper and lower edges of the bar 122. These rollers provide not only a support for the reciprocating bar but also permit free reciprocation thereof.

The bar is caused to reciprocate by actuation of the motor 130 (see Fig. 18). The motor is provided with suitable gear reduction means which cause a comparative slow rotation of a shaft 132. The rear end of the shaft is suitably journaled and is provided with a laterally extending arm 134 to which one end of a link 136 is pivotally mounted by means of the pivot pin 138. The other end of the link 136 is pivotally secured to the reciprocating bar 122 by means of a pin 140. It will be clear that each rotation of the shaft 132 will cause one complete reciprocating movement of the bar 122. The motor is geared down so that during one cycle of operation the shaft 132 will rotate three times, thus completing three reciprocations of the bar 122, three step by step movements of the ratchet wheel 86 and the shaft 62, and will cause the chains 58 and 60 to advance three links and thereby position the next successive food article so that it can be ejected, cooked, and dispensed upon the next cycling of the machine.

At the bottom of the machine and adjacent each magazine there is located a solenoid 142 mounted on a suitable support 144 which, in the particular embodiment shown, constitutes a channel member having outwardly extending flanges 146 adapted to be secured to the base of the machine. At one end of the support 144 at the rear of the machine, an upwardly extending arm 148 is mounted for pivotal movement. Each longitudinal edge of the arm 148 is flanged as at 150 and is provided at the bottom thereof with downwardly extending ears 152. A pin 154 extends between the sides of the channel member 144, the ends of which are received in suitable openings in the ears 152 to thereby pivotally support the upwardly extending arm 148.

The upper end of this arm is bifurcated as at 156 and is received in an annular recess 158 of a small wheel 160, which in turn is mounted for sliding movement longitudinally of a stub shaft 162. The outer end of the stub shaft has a pin 164 passing therethrough for the purpose of limiting the outward movement of the wheel 160.

The arm 148 is held normally in a position such that the wheel 160 bears against the pin 164. The means by which this is accomplished comprises a bracket 166 which extends upwardly from one side of the support 144 and pivotally supports a link 168 by means of a pivot pin 170 located between the ends of said link. The upper end of the link 168 is pivotally secured to one end of another link 172, the other end of which is secured to one of the flanges 150 of the arm 148. A tension spring 174 extends longitudinally of the supporting base 144 and is secured at one end to the lower end of the link 168 and at its other end to a pin 176 extending laterally from the support 144. It will thus be evident that the tension of the spring 174 through the links 168 and 172 will maintain the arm 148 and the wheel 160 in a position such that the wheel bears against the pin 164. However, the pivotal mounting of the arm 148 will permit it to be moved forwardly and slide the wheel 160 toward the opposite end of the stub shaft 162.

This movement of the arm 148 is accomplished when the solenoid 142 is energized. Spaced upwardly from the bottom of the arm 148 a forwardly extending ear 178 is provided which is connected to the core 180 of the solenoid by means of a link 182. It will then be clear that when the solenoid is energized the arm 148 will be moved against the tension of the spring 174, thus sliding the wheel 160 longitudinally of the stub shaft 162.

Referring now for a moment to Figs. 7 and 8, it will be noted that the tail piece 112 of the pawl 106 in its normal position is in alignment with and bears against one portion of the wheel 160, thus holding it out of engagement with the ratchet wheel 86. As soon as the solenoid 142 is energized and the wheel 160 is moved out of the path of the pawl 106, the spring 114 will urge the upper end 110 of the pawl downwardly so that it will engage a notch 88. The solenoid is energized momentarily. However, as soon as the pawl engages the ratchet wheel, the tail piece 112 thereof will be moved in the path of movement of the wheel 160, so that for a short period of time the wheel will be prevented from moving outwardly to the end of the stub shaft 162 by bearing against the tail piece of the pawl.

A disc 184 (Figs. 7, 8, 9, and 10) is mounted for rotative movement adjacent and forwardly of the ratchet wheel 86. The disc 184 is provided with a plurality of radially extending slots 186 and is mounted for rotative movement on a shaft 188. Extending forwardly toward the front of the machine from one face of the ratchet wheel 86, a plurality of spaced apart studs 190 are provided. These studs are adapted to enter the slots 186 and thereby impart a rotative movement to the disc 184. It will be observed, further, that the disc 184 is provided with diametrically opposed cut-out portions or circumferentially extending notches 192 and 194. One of these notches is normally located immediately above the wheel 160. The diameter of the disc 184 is such that its periphery will extend downwardly beyond the upper edge of the wheel 160 and immediately in front thereof. When one of the notches 192 or 194 is located immediately above the wheel 160, the latter will be free to move along the shaft 162; however, at any other position of the disc 184 this would not be possible.

Referring for a moment to Fig. 8, it will be noted that the space between the pawl 106 and the disc 184 is substantially equal to the width of that portion of the wheel 160 positioned rearwardly of the annular slot 158 therein. Likewise, the axial thickness of the disc 184 is substantially the same as the width of the annular groove 158. The operation of this particular portion of the mechanism will then be as follows:

As soon as the machine begins its cycle the solenoid 142 will be energized, thus moving the wheel 160 forwardly on the shaft 162. This action will be permitted because the cut-out portion 192 is immediately above the wheel 160. As soon as this action occurs the pawl 106, which has been held out of engagement by reason of its bearing against the wheel 160, will be permitted to drop into one of the notches 88 of the ratchet wheel 86. At substantially the same moment the reciprocating bar 122 begins to move, thus rotating the ratchet wheel 86 and the disc 184. Only a slight rotation of the latter disc is necessary before the end of the cut-out portion 192 is reached, at which time the peripheral edge of the disc 184 is received within the annular slot 158 on the small wheel 160. As stated before, the solenoid is energized only momentarily and the spring 174 will then urge the wheel 160 rearwardly, but this movement is prevented by reason of the edge of the disc 184 being received in the annular groove 158. The desired number of reciprocations of the bar 122 then proceeds to take place and at the end of the last stroke the opposite cut-out portion 194 in the disc 184 will have been moved to the position occupied previously by the cut-out portion 192 immediately above the wheel 160. At this point the wheel 160 will then be free to move outwardly to the end of the stub shaft 162 by reason of the spring 174. On the final return movement of the bar 122 the wheel 160 will have been moved into the path of the pawl 106, and the edge of the tail piece 112 thereof, by camming against the wheel, will thereby prevent the projection 110 from entering a notch 88 and the machine is stopped.

It should also be noted that we provide a small arm 196 which is pivotally mounted at 198 to the magazine and is provided with a laterally extending pin 200 at its upper end. A spring 202 coiled around the pivot pin 198 has one end thereof bearing against a small pin 204 and the other end against the arm 196, so that it is constantly urged into contact with the periphery of the ratchet wheel 86. The size of the pin 200 is such as to be received in one of the notches 88 of the ratchet wheel 86. Viewing Fig. 7, then, it will be evident that when the ratchet wheel is rotated in a clockwise direction by means of the pawl 106, the pin 200 will be easily cammed out of a notch 88. However, when the pawl reaches the end of its stroke the pin 200 will have been received in the next successive notch 88 and prevents the ratchet wheel from being moved in a counter-clockwise direction since the line of force will be longitudinally of the arm 196 through the pin 200 and the pivot 198. Since the ratchet wheel cannot be moved in a counter-clockwise direction, the projection 110 on the end of the pawl will be cammed out of the notch 88 and will be returned to its initial starting point whereupon it drops into the next successive notch for a subsequent partial rotation of the ratchet wheel.

In the specific form of the invention shown we have four of the forwardly extending pins 190. Also, it has been indicated that to advance the magazine a sufficient distance it is necessary to reciprocate the bar 122 three times, meaning that the ratchet wheel 86 will be rotated through three-quarters of a turn. The relationship between the ratchet wheel 86 and the adjacent disc 184 is such that three-quarters of a revolution of a ratchet wheel will complete a one-half revolution of the disc 184, so that at the beginning and end of each cycle of the machine one of the cut-out portions 192 and 194 thereof will be located immediately above the small wheel 160.

The cooking assembly

This phase of the invention is disclosed in Figs. 11, 12, 13 and 14 of the drawings. However, in describing the cooking assembly it will also be necessary to refer occasionally to the right-hand portion of the wiring diagram in Fig. 28.

Briefly, the cooking assembly involves the use of a transmitting plate supply transformer for the purpose of raising the voltage from 110 volts up to 2500 or 3000 volts. Two filament transformers are also utilized, one of which is connected to a pair of rectifier tubes which change the current from alternating to direct, and the other of which is connected to the oscillator tubes which produce the high frequencies necessary to perform the cooking operation. The arrangement of these various parts and their connections to each other will be apparent upon viewing the various figures in the drawings above mentioned.

Referring first to Figs. 11 and 12, it will be observed that these views are of the inside of the door in its opened position. Spaced upwardly a short distance from the bottom is a lower shelf 206 above which is an intermediate shelf 208. In the particular embodiment of the invention disclosed herein the various transformers and the rectifier tubes are mounted on the lower shelf while the oscillator tubes forming the cooking unit are mounted on the intermediate shelf.

Spaced a short distance upwardly from the intermediate shelf 208 and insulated therefrom is a small shelf 210 on which one of the oscillator tubes 212 is mounted in an upright position on a base 214. A second oscillator tube 216 is mounted in spaced relation to the first tube in an inverted position on a base 218 which in turn is suspended from a bracket 220 by means of an insulator 222.

The cooking coil itself, indicated at 224, is preferably, though not necessarily, formed of solid copper wire, which is preferably provided with a coating of tin. One end 226 of this wire is secured to the plate of the oscillator tube 212 and the other end 228 is secured to the plate of the other oscillator tube 216. Between its ends this wire is coiled around a vertically extending glass tube 230 within which the food article to be cooked is located during the cooking period. A grid coil 232 is connected at one end to the grid 234 of the tube 212 and at its other end to the grid 236 of the tube 216.

It is important that the length of wire extending between the ends of the coiled portion of the cooking element and their respective tubes be substantially the same, since any difference in such length will set up an unwanted inductance. For this reason the oscillator tubes are reversed, one being connected at the top of the coil and the other at the bottom thereof.

A wire 238 is connected to the center of the cooking coil 224 and extends therefrom through a radio frequency choke 240, through an insulator 242, and thence to a filament transformer 244. The ends of the secondary winding in the transformer 244 are connected to the filaments of the rectifier tubes 246 (Fig. 28).

From the center of the grid coil 232 a wire 248 is connected through a grid resistor 250 and to the center of the secondary of the other filament transformer 252. Also connected to this line are two filament by-pass condensers 254. These condensers are used to avoid having the radio frequency current flow through the transformer or resistor, either of which may have considerable reactance at high frequencies. The ends of the secondary winding in the transformer 252 are connected to the filaments of the oscillator tubes 212 and 216 (Fig. 28).

The plate transformer indicated at 256 has a primary of 110 volts and 60 cycles but its secondary is either 3000-0-3000 or 2500-0-2500. The center of the secondary winding of the plate transformer 256 is connected directly to the line 248 extending from the center of the filament transformer 252 through resistor 250 to the grid coil. The ends of the secondary winding of the transformer 256 are connected directly to the plates of the rectifier tubes 246, as indicated by the lines 260 and 262 in Fig. 28.

Figs. 11 through 14 show the arrangement of the various parts of the cooking circuit within the cabinet, but for a general understanding as to the actual operation of the circuit reference will be had to Fig. 28. It is not necessary to discuss in detail the theories underlying the operation of the cooking circuit, however, a brief summary as to the purpose of each part of the circuit may be helpful in gaining a general understanding as to the operation of the machine.

It will be noted that the plate transformer 256 and the two filament transformers 244 and 252 are all connected in parallel across the supply line. The filament transformer 244 which energizes the filaments of the rectifier tubes 246, and the filament transformer 252 which energizes the filaments of the oscillator tubes 212 and 216 are constantly energized, being connected directly across the supply lines. Since it is necessary that the entire operation, from the time the patron deposits a coin and makes his selection to the time that the sandwich is cooked and ready to be dispensed, should be as short as possible, by having these filaments constantly energized no time is wasted in waiting for the tubes to warm up. The line connecting the plate transformer with the main supply line is provided with a switch 264 which is closed as soon as the main circuit is energized, to set the cooking apparatus in operation. As stated before, the plate transformer raises the voltage from 110 to around 2500 or 3000 volts, and the rectifier tubes 246, by full wave rectification, change the current from alternating to a pulsating direct current. This direct current then supplies electrons to the filaments of the oscillator tubes which discharge electrons to the plates when the plates are at a positive potential. The oscillator is the conventional tuned-plate tuned-grid circuit. In the present instance the grid and plate circuits are tuned to oscillate at frequencies in excess of 50 megacycles. The high frequencies produced will result in heating the object within the field of the cooking coil to a high temperature and since this coil surrounds the glass tube 230 within which the sandwich has been placed, the latter will be thoroughly heated in approximately thirty seconds.

As stated heretofore, immediately after a selection has been made and a coin deposited a sandwich is ejected from the selected stack and is directed to the container 230. This is accomplished by depositing the sandwich into the funnel shaped member 266, which is connected to the upper end of the container.

It may here be stated that experience has proven that the best results are obtained in cooking frankfurter sandwiches after the sandwich itself is first wrapped in a paper napkin and then placed in a sealed bag formed of a material such as Cellophane. When the frankfurter is being cooked a certain amount of moisture is given off and it is desirable to retain this moisture within the outer bag for two reasons. One reason is that the moisture, if allowed to escape, would be deposited on the various parts of the mechanism and possibly render it useless; the other reason being that the moisture produced is at a very high temperature and probably aids in the thorough and quick cooking of the article. By wrapping the sandwich itself in a paper napkin or some other absorbent material, it has been found that this absorbs some of the moisture and prevents the sandwich bun from becoming soggy.

After the sandwich has been thoroughly cooked in the manner above described it is ready for consumption and will then be dispensed by means which will be more fully described hereinafter.

The push-button assembly

The push-buttons, which may be selectively actuated to cause a cycling of the machine, have previously been indicated in Fig. 1 by the numerals 10, 12, and 14. Any number of such push-buttons may be provided, as desired. The push-buttons themselves are so mounted as to extend through openings in the door and are coupled with an assembly mounted on the inside of the door, such as shown in Figs. 12 and 26. The details of this assembly are fully disclosed in the application of Ernest H. Thompson and Leo W. Doggett, Serial No. 319,224 and are shown in Figs. 15, 16, and 17, to which we shall refer in the following brief description thereof.

This assembly comprises two facing channel members 268 and 270. Adjacent the upper end of these members a holding solenoid 272 is mounted having a core 274 extending downwardly from the lower end thereof. A vertically extending holding bar 276 is mounted for reciprocating movement at one side of the assembly and at its upper end is suspended from the core 274 by means of a pin 278. When this holding bar 276 is moved upwardly by actuation of one of the push-buttons, the solenoid 272 will be energized when the circuit is closed, so as to hold the bar 276 in its elevated position. This bar is urged downwardly when the circuit is open by means of a coiled spring 280.

The holding bar extends downwardly at one side of the push-buttons as shown in Fig. 15 and opposite each of the push-buttons this bar is recessed as shown, so as to provide upper shoulders 282, 284 and 286 and lower shoulders 288, 290 and 292. At the opposite side of the assembly two vertically reciprocating locking bars 294 and 296 are provided, one above the other. As will presently be seen, the holding bar 276 will maintain any of the push-buttons in actuated position and the locking bars 294 and 296 will prevent actuation of another push-button after one is in actuated position. Each of the locking bars is provided with a protruding portion extending toward the push-buttons, thereby providing upper and lower shoulders 298 and 300 on the bar 294 and similar upper and lower shoulders 302 and 304 on the lower bar 296.

Referring now to Fig. 17, it will be noted that the section is taken through the center of the upper push-button 10 but the other push-buttons 12 and 14 are shown in side elevation. Each push-button is similar in construction and a description of one will suffice for all. Referring to the upper push-button 10 in Fig. 17, it will be observed that it is provided with an annular shoulder 306 adapted to receive the connecting web 308 of a U-shaped member having spaced apart rearwardly extending legs 310 and 312. This U-shaped member is secured to the push-button by means of a C-lock washer 314.

The leg 310 of the U-shaped member is on the left hand side of the push-button looking from the front thereof, as in Fig. 15, and is on the far side when viewing Fig. 17. The opposite leg 312 is on the right hand side, as viewed in Fig. 15. The leg 310 is provided with two rearwardly extending, spaced apart arms 316 and 318; the upper arm 316 being provided with an inclined camming edge 320, while the lower arm 318 is provided with a similar but reversely inclined camming edge 322. The other leg 312 is also provided with two spaced apart, rearwardly extending arms 324 and 326; the upper arm 324 having an inclined camming edge 328, and the lower arm 326 being provided with a downwardly extending projection 330. The leg 310 is adapted to actuate the locking bars and the leg 312 actuates the holding bar when a push-button is operated.

Each of the push-buttons is recessed inwardly from its inner end and receives a sleeve 332 provided with a flanged end 334 adapted to fit snugly against the bottom of the recess. A coiled compression spring 336 is received within the recess of the push-button and around the sleeve 332, bearing at one end against the back of the assembly 270 and at its other end against the flange 334, so as to normally urge the push-button outwardly.

The sleeve 332 is provided with a hole passing longitudinally therethrough which has between its ends a shoulder 338, against which the head 340 of a pin 342 is adapted to bear. The pin 342 extends rearwardly through the sleeve and is limited in its movement because of the shoulder 338. The pin is urged rearwardly by means of a coiled compression spring 344, received within one end of the sleeve 332 and bearing against the head 340 of the pin 342, as shown. It will thus be evident that the coiled spring 336 will urge the push-button outwardly and the coiled spring 344 will urge the pin 342 rearwardly.

Immediately in back of each push-button is located a switch to be actuated thereby. These switches are indicated by numerals 346, 348 and 350 and are mounted on a vertically extending angle member 352. The switches are provided with spring arms 354, 356 and 358, which arms are located immediately behind openings such as 360 in the channel member 270, which openings are in turn located immediately behind each of the pins 342. It will be clear, therefore, that upon moving any one of the push-buttons rearwardly the pin 342 connected therewith will pass through an opening 360 and bear against a spring arm, such as 354, to close the switch.

The upper end of the holding bar 276 has a finger 362 extending forwardly so as to actuate a spring arm 364 of a master switch 366 when in its elevated position. The operation of the push-button assembly will then be substantially as follows:

Let it be assumed that it is desired to operate the upper push-button 10 in which case, as soon as it is moved rearwardly, the camming edge 328 of the right hand leg thereof will cam against the upper shoulder 282 of the holding bar 276, thus elevating it to close the master switch 366, which in turn energizes the solenoid 272 and thereby maintains the holding bar in its elevated position. As the push-button is moved rearwardly and the holding bar moves upwardly, the downwardly extending projection 330 of the right hand leg will be moved behind the holding bar, so that as long as the holding bar is in elevated position, the push-button cannot be returned to normal position by the action of the coiled spring 336. Likewise, the same projections 330 on the other two push-buttons will remain in front of the holding bar which, in its elevated position, will be immediately behind such projections and prevent those other buttons from being pushed. The holding bar will then maintain the selected push-button in actuated position as long as the solenoid 272 remains energized.

Neither of the locking bars 294 and 296 will be actually moved when the upper push-button 10 is actuated, but it will be observed that when the upper button is in actuated position the two lower buttons will be unable to be moved because when they are moved they must elevate one or both of these bars. When the upper push-button 10 is actuated the lower edge of the left hand leg 310 at its widest portion will be immediately above the shoulder 298. These bars 294 and 296 will therefore be prevented from being raised. If the center push-button 12 is actuated, the left hand leg 310 of the U-shaped member will elevate the upper bar 294 only, thus preventing the upper and lower push-buttons 10 and 14 from being actuated. When the bottom push-button 14 is actuated both of the bars 294 and 296 will be elevated, thus locking the push-buttons 10 and 12 against inward movement. It will therefore be evident that when any one of the push-buttons is actuated the holding bar 276 will be elevated, thus closing the master switch 366 and energizing the solenoid 272, which maintains the holding bar in elevated position as long as the machine is in operation. The holding bar also prevents the actuated push-button from resuming its normal position. As soon as the push-button is moved inwardly a sufficient distance, the switch associated therewith will be closed. As a matter of fact, in actual practice one of the switches 346, 348 or 350 will be closed just before the master switch is closed, since these switches are the ones which select the specific magazine from which a sandwich is to be ejected and which is advanced to the next successive position. After the cycle of the machine has been completed the master switch 366 will be opened, thus de-energizing the holding solenoid 272 and permitting the holding bar 276 to drop downwardly and return the actuated push-button to its normal position.

*The motor operated switches*

There are three switches which are operated directly from the motor, namely, the full stroke switch, the reset switch, and the clutch and ejector switch. The full stroke switch is for the purpose of insuring delivery of merchandise, even though there may be a power failure; the reset switch acts to open the circuit at the end of a cycle; the clutch and ejector switch, as stated before, energizes the clutch solenoid to cause one of the stacks to advance and simultaneously ejects a sandwich from the selected stack. In describing these various switches, reference will be had to Figs. 18, 19, 20 and 21; occasional reference will also be had to the wiring diagram in Fig. 28.

Referring now to Fig. 18, the motor has previously been indicated at 130 and it was stated that the shaft 132 was geared down so that it made three complete revolutions for each cycling of the machine. A small gear 368 is mounted on the shaft 132 which has in engagement therewith a larger gear 370 mounted on a short shaft 372. Since it is desirable in the particular embodiment of the invention disclosed herein to have the gear 368 make three revolutions for each cycle of the machine, the gear 370 is of such size as to rotate once during three rotations of the gear 368.

The shaft 372 has mounted thereon three discs 374, 376 and 378. The disc 374 is provided with a protruding cam element 380, while the disc 376 has a similar cam element 382 and the disc 378 is provided with a cam element 384. Each of these cam elements make one revolution during the cycling of the machine and operate to close certain switches during the cycle. These cam elements and corresponding switches are shown in side elevation in Figs. 19, 20 and 21, respectively.

Considering first the cam element which actuates the full stroke switch 386 in Fig. 19, it will be noted that this switch has two poles 388 and 390 between which a spring arm 392 is positioned. In the normal unactuated position, the full stroke switch is closed to the pole 388. Referring for a moment to Fig. 28, it will be observed that one side of the motor 130 is connected directly to one side of the supply line, while the other side thereof is connected normally through the switch 386 to the other side of the supply line, through the master switch, the coin switch and the door switch. As soon as the master switch is closed mechanically by operation of a push-button and the coin switch and door switch are closed, the motor starts and the cam element 380 will move upwardly past the arm 392. As soon as the element passes the arm it will spring downwardly to contact the pole 390, thus connecting the motor directly across the two supply lines. The motor remains thus connected throughout the cycling of the machine during which time, if there is a power failure momentarily, the motor will resume operation as soon as the power is resumed, thus insuring a full cycling of the machine each time. At the end of the cycle the cam element 380 will again stop in the position shown in Fig. 19, where the arm 392 contacts the pole 388, thus connecting the motor back into the main circuit. Suffice it is to say for the present, however, that by this time the main circuit will have been de-energized so that the switch goes back to a dead line and the motor will stop.

The reset switch 394 in Fig. 20 is for the purpose of energizing a reset solenoid and opening the coin switch for de-energizing the main circuit. This switch is normally open and is not closed until near the end of the cycle. When the cam element 382 nears the end of its single revolution, the reset switch will be closed by reason of the cam element bearing momentarily against the arm 396 which in turn contacts the pole 398. The exact function of this switch will be more apparent when the wiring diagram is considered in detail.

The clutch and ejector switch 400 in Fig. 21 is provided with a spring arm 402 and a single pole 404. This switch is normally open, as shown, but the camming element 384 closes the switch as soon as the motor starts to thus actuate the ejector and clutch solenoids. As soon as the cam element passes the spring arm, the switch will immediately open and the element will continue its single revolution and will again stop in the position shown in Fig. 21 at the end of the cycle.

A brief résumé as to the operation of these switches is as follows:

Immediately upon closing the master switch by means of a push-button the motor 130 will start, assuming that the coin and door switches are closed. As soon as the motor starts and the shaft 372 begins to rotate, the cam element 380 will move past the spring arm 392 and switch the motor directly across the lines. At substantially the same moment the camming element 384 will close the clutch and ejector switch 400 momentarily. The last of these switches to operate is the reset switch, which is closed momentarily immediately before the end of the cycle. Closing of this switch opens the main circuit but the motor continues to run until it is switched back to the main circuit which, having been de-energized, will stop the motor, thus then completing the cycle of the machine.

*The ejector solenoid and the empty lock*

The details of the ejector solenoid and the empty lock switch are shown in Figs. 22 and 23. However, the solenoids as they appear in the machine when the door is open are shown in Fig. 4. Referring now to Fig. 22, an ejector solenoid 406 is provided for each storage magazine and is suspended from a shelf 408 in the main compartment of the cabinet. The solenoid has, projecting rearwardly therefrom, a core 410 which at its rear end is bent upwardly and is connected to a substantially horizontally extending plate 412, which is located immediately above that side of the stack of sandwiches which moves upwardly when it is advanced.

Each longitudinal edge of the plate 412 is flanged upwardly as at 414 and each flange is provided at its front end with a pair of vertically spaced apart rollers 416 and at its rear end with a similar pair of vertically spaced apart rollers 418. The rear end of the plate 412 is bent downwardly to form a substantially vertically extending plate 420, the lower end of which is located immediately behind the topmost sandwich of the stack.

A thin plate 422 is suitably mounted at each side of the plate 412 and adjacent each of the flanges 414, and is received between the rollers 416 and 418 so as to provide a track upon which the rollers may move. A coiled spring 424 extends horizontally at the top of each magazine and has the rear end thereof suitably secured in any desired manner to a stationary part of the cabinet, while the forward end thereof is fastened to one of the flanges 414, thus urging the carriage comprising the plates 412 and 420, together with the connected core 410, rearwardly at all times. As soon as the clutch and ejector switch 400 (Figs. 21 and 28) is closed the selected ejector solenoid 406 will be energized, and, against the tension of the spring 424, will move the carriage forwardly. The vertically extending plate 420 will thus come against the rear end of the topmost sandwich 78 and eject it into the funnel shaped member 266 (see Fig. 13) where it is directed to the glass container 230 and is subjected to the high frequency currents for cooking. As soon as a sandwich has thus been ejected and the carriage returned to its normal position (because the solenoid 406 is energized only momentarily) the advancing mechanism is operated to advance the stack from which the sandwich was ejected, so that the next successive sandwich will be in a position to be ejected at the next cycling of the machine.

Referring again to Fig. 22, it will be observed that the rear plate 420 has a pair of forwardly extending ears 426 between which a pivot pin 428 is positioned for the purpose of pivotally supporting a testing finger 430. This testing finger extends forwardly and downwardly and in the normal position of the various parts, will rest upon the top of a sandwich 78 as shown in the full line position thereof. This testing finger is provided with a rearwardly extending tail piece 432 which extends through a suitable opening in the plate 420.

The empty lock switch 434 is also mounted on the shelf 408 immediately behind the plate 420, in such a position that the tail piece 432 will bear downwardly against a spring arm thereof, so as to permit the switch to open when there is no sandwich in the topmost compartment of the stack, to open the circuit and cause a return of a deposited coin. The switch 434 has an arm 436 provided with a pole 438. The spring arm 440 is normally sprung away from the pole or contact 438 to maintain the switch normally in open position. It will be evident that when there is no sandwich in the uppermost compartment of any stack there will be no support for the testing finger 430 which will then assume the dotted line position thereof as shown in Fig. 22. When in this position the tail piece will be elevated and will permit the arm 440 of the switch 434 to spring away from the contact to thereby open the electric circuit. When a sandwich is present in the uppermost compartment the tail piece 432 will bear downwardly against the arm 440 to close the switch.

Referring for a moment to Fig. 28 where the single pole empty lock switch 434 is shown in association with stack No. 1, it will be noted that a similar single pole switch 534 is associated with stack No. 2 and another single pole switch 634 is associated with stack No. 5. We have provided two of these switches with double poles, as indicated at 435 and 437, in association with stacks Nos. 3 and 4, respectively. For the moment it will be sufficient to explain that when any one of the switches 434, 534, or 634 is open the circuit to the coin reject solenoid will be de-energized. When the coin reject solenoid is thus de-energized a deposited acceptable coin will be diverted to the return coin chute, thus preventing operation of the machine when there is no sandwich to be delivered. As we have stated heretofore, it may be desirable to provide as many as two or three stacks of sandwiches of the same type or brand; when one stack is exhausted, instead of opening the circuit and preventing operation of the machine, the circuit will be switched to the next stack, so that all of the two or three stacks of similar sandwiches may be exhausted before the machine will cease operation. The manner in which this is done will be observed by viewing the wiring diagram of Fig. 28, where the empty lock switches 435 and 437 are shown as having two poles. These switches will be similar to the switch 434 shown in Fig. 23, except that a second pole will be located above the spring arm 440, so that when the arm is permitted to be elevated by action of the testing finger, instead of opening the switch it will merely be closed to the other contact. The wiring diagram shows clearly, for example, that when the pushbutton 14 is actuated to close the circuit, if there is no sandwich in the uppermost compartment in the center stack No. 3, the testing finger will have allowed the spring arm of switch 435 to move over to the next contact, thereby connecting the circuit with stack No. 4. When this stack becomes empty the second double pole switch 437 is closed to the other contact, thus switching the circuit over to the stack No. 5. When this stack becomes empty, however, the single pole switch 634 at the right hand side of the wiring diagram will open the circuit, thus causing return of subsequent deposited coins.

If all five stacks contained the same type or brand of sandwich, then it would be desirable to provide only one single pole switch 434 at the top of stack No. 5, but four of the double pole switches such as 435. On the other hand, if each of the five stacks contained different types or brands of sandwiches, then it would be desirable to provide each stack with a single pole switch like 434. In the final analysis then, it will be clear that when all of the sandwiches of any one particular type or brand have been exhausted there can be no further operation of the machine, since each subsequent deposited coin will be returned to the customer.

The door lock and door switch

The details of the door lock are shown in Figs. 24 and 25. The positioning of the door switch with respect to the door itself is shown in Fig. 13.

As we have stated before, in this particular embodiment of the invention it is necessary to have three switches closed to energize the main circuit, namely the door switch, the coin switch and the master switch. The door switch is normally closed, the coin switch will be closed as soon as the coin is deposited and the master switch, as explained hereinbefore, will be mechanically closed by actuation of one of the push-buttons. If any one of these switches are opened during a cycling of the machine, the machine will immediately cease operation. It is therefore desirable, in order to insure complete cycling, that the door be locked in its closed position, thus maintaining the door switch closed. This is done by means of a solenoid 442 which is mounted in any suitable manner within the machine and adjacent the door 18. Referring particularly to Fig. 25, it will be observed that the solenoid 442 is provided with a core 444 which has pivotally secured thereto at its outer end one end of a link 446, which in turn is pivotally mounted at substantially its center by means of a pivot pin 448. At the other end of the link 446 a locking bar 450 is secured which is mounted for sliding movement toward and away from the door, but is normally held away therefrom by means of a coiled compression spring 452 surrounding the core of the solenoid, bearing at one end against the solenoid, and at its other end against the link 446. The locking bar 450 is suitably mounted adjacent a plate 454 located adjacent one side 456 of the door 18 and is mounted for movement into and out of an opening 458 in the side 456.

In Fig. 24 it will be noted that the bottom of the door is provided with spaced apart, downwardly extending brackets 460 mounted for rotative movement on a horizontal rod 462. Another view of this may be seen in Fig. 12. When the door is in its closed position it bears against a spring arm 464 of the door switch 466 (Fig. 13).

When the door is opened, as in Fig. 24, the door switch will open and thus prevent the main circuit from being energized, as may be seen in the wiring diagram in Fig. 28. It is therefore necessary that the door be locked in closed position during cycling of the machine. When the door is closed and the machine begins operation, the solenoid 442 will immediately be energized, thus moving the locking bar 450 toward the left, as viewed in Fig. 25, which passes through the opening 458 in the side 456 of the door 18. As long as the solenoid is thus energized, the door will remain locked in closed position. When the machine ceases operation the solenoid 442 will be de-energized, thus permitting the door 18 to be opened.

From the description thus far we have seen how the sandwich is delivered to the cooking assembly and is cooked. It will now be observed, by having particular reference to Figs. 13, 14, and 24, how the sandwich is removed from the cooking assembly and deposited in the door where access may be had to it by a customer. The upper part of the door 18 is provided with a transversely extending plate 468 which has connected thereto at its center an upwardly extending plate 470 which extends through an opening 472 in the intermediate shelf 208 at the front side thereof. The glass support 210 on which the oscillator tubes and the container are mounted is also provided with an opening immediately below the container 230. Slidably mounted above the shelf 210 is another glass plate 474 which extends beneath the container 230 and on which the sandwich is supported during its cooking period. A downwardly extending member 476 is secured to the front end of the plate 474 and rearwardly thereof at each side is located a pin 478. A spring 480 is attached at each end to one of the pins 478 and passes around the member 476 to thus hold the plate 474 in rearward position. After the sandwich has been cooked, however, and the door lock released, upon opening the door the projection 470 will bear against the member 476, thus moving the plate 474 forwardly out from under the sandwich, permitting it to drop downwardly into the door. The outer position of the member 476 and its connected plate 474 is shown in dotted lines in Fig. 13 and in full lines in Fig. 24. After the door has been opened and the sandwich removed, the door may again be closed, after which the spring 480 will urge the parts back to their normal position, as shown in Fig. 13; the door switch 466 will be closed and the machine is then in readiness for another cycle.

The coin mechanism and coin switch

The coin rejector mechanism is shown in relation to the other parts of the machine in Figs. 11 and 12 and is shown in more detail in Figs. 26 and 27 to which reference will be had in the following description thereof. The coin rejector mechanism itself is a commercial assembly, the construction of which is well known and can be purchased in the open market. In adapting the coin rejector mechanism to our particular uses, however, we have made additions thereto such as the coin reject solenoid, the coin switch and the reset solenoid.

Referring to Figs. 26 and 27, the coin rejector mechanism is indicated by the numeral 482 and is mounted inside the door of the machine. The mechanism is provided with a coin chute 484 which directs a deposited acceptable coin into a coin box 486. A coin return chute 488 is located adjacent the main coin chute and delivers the rejected coin to the return coin opening 22.

If the coin is an acceptable one it is immediately directed to the coin chute 484; if it is not acceptable the usual and well known devices are provided for directing the coin immediately to the return coin chute 488. Also, an acceptable coin, when deposited during operation of the machine or when one or more of the magazines are empty, will be directed to the return coin chute.

The coin reject solenoid 490 is mounted at one side of the coin rejector mechanism and is inclined so that the core 492 thereof which projects downwardly will pass through an opening 494 into the main coin chute 484. This solenoid is normally energized so that a deposited acceptable coin will be directed immediately to the main coin chute. However, during operation of the machine or when one or more of the stacks are empty the coin reject solenoid will be de-energized, thus permitting the end of the core 492 to project inwardly through the opening 494 and direct the coin to the return coin chute 488.

The coin switch and the reset device are mounted on what may be termed an "adaptor" mechanism 496 which is located immediately below the main portion of the coin rejector mechanism. The coin switch 498 is a double pole switch and has a spring arm 500 adapted to flex between the two contacts, but so arranged that in its normal position it will close the circuit through the coin reject solenoid, so that said solenoid will be normally energized. Means are provided for moving the arm 500 to the other contact after a coin has been deposited, to de-energize the coin reject solenoid and close the main circuit.

This means includes an arm 502 pivotally mounted on a pin 504 below the switch 498. The outer free end of the arm is provided with a laterally extending finger 506 which extends through an arcuate opening 508. This arc has as its center the pivot pin 504, so that when the arm 502 is rotated, the finger 506 will traverse the arcuate slot. The other end of the arm 502 is provided with a laterally extending curved portion 510. The arm is maintained in either of its extreme upper or lower positions by means of a spring 511. The connection of this spring is such that it passes dead center as the arm is rotated from one position to another so that it will maintain the arm in either of its two extreme positions.

A reset solenoid 512 is mounted on the adaptor 496 immediately below the arm 502 and has an upwardly extending core 514 which is connected to a laterally extending flange 516 of an arm 518, which is in turn mounted for rotative movement on a pivot pin 520. A coiled spring 522 surrounds the pin 520 and maintains the arm 518 in its upper position, as shown in Fig. 26, thus holding the core 514 outwardly of the solenoid 512.

When an acceptable coin is deposited in the coin slot 8 it passes downwardly through the coin chute 484 and carries with it the arm 502 by bearing against the finger 506 which extends into the path of the coin. After the spring 511 has passed dead center, as the arm 502 moves downwardly, the coin continues and is deposited in the coin box 486. This movement of the arm 502 will move the spring arm 500 of the switch 498 to the other contact by reason of a flange 523 on the arm 502 bearing thereagainst. In this downward position of the arm 502, the coin switch 498 will be closed to the main circuit and the laterally extending curved portion 510 thereof will have been moved upwardly adjacent the forwardly curved end 424 of the flange 516 on the arm 518.

It has been stated before that the reset solenoid is not energized until just before the end of the cycle. The reset solenoid 512 will be energized momentarily near the end of the cycle when the cam element 382 momentarily closes the reset switch 394 (see Fig. 20). When the solenoid is thus energized it pulls the arm 518 downwardly. Downward movement of this arm will return the arm 502 to its upper normal position by reason of the curved end 524 bearing against the lateral extension 510. It will be remembered that the two parts 510 and 524 are adjacent each other before the solenoid is energized. The downward movement of the arm 518 is sufficient to move the arm 502 upwardly past dead center of the spring 511, after which the end 510 of the arm 502 will be out of the path of the portion 524 so as not to interfere with the return movement of the arm 518. When the arm 502 is returned to its normal position the spring arm 500 of the coin switch will then move back to its normal position, closing the circuit through the coin reject solenoid 490, thus energizing it and permitting a subsequently deposited coin to again actuate the coin switch.

The electric circuit

The wiring diagram of Fig. 28 will explain the connections between the various switches and solenoids and since the mechanical details of the various parts of the machine have been fully explained, an understanding of the way in which they are electrically connected will give a clear understanding as to the operation of the machine.

In Fig. 28 it will be noted that the motor 130 and the various solenoids such as the holding solenoid 272, the door lock solenoid 442, the reset solenoid 512 and the power relay solenoid 526 are all connected in parallel. The supply lines are indicated at 528 and 530 with a fuse 532 located in one side of the line. The various switches are shown in their normal positions when the machine is idle. It will be noted that the door switch 466 is closed. The coin switch is closed through the coin reject solenoid and the empty lock switches 434, 534 and 634 are closed, so that when the machine is not in operation the circuit, including the door switch, the coin switch, the coin reject solenoid, and the single pole empty lock switches, is closed. The master switch 366 is normally open so that even if it is closed by actuation of one of the push-buttons without having deposited a coin, the machine will not operate because the coin switch is not normally connected in this circuit.

The reset switch 394 and the clutch and ejector switch 400 are normally open while the double pole, full stroke switch 386 is closed through one circuit. The power relay switch 264 is also open. It will be evident that in order to close the circuit through the motor and through the holding, door lock and power relay solenoids, the door switch, coin switch, and master switch must all be closed. The door switch 466 is normally closed when the door 18 is closed. The coin switch 498 will be closed through the main circuit upon depositing a coin and the master switch 366 will be closed by the mechanical connection 276 between it and each of the push-buttons 10, 12 and 14 when they are actuated. The closing of the coin switch 498 across the main circuit opens the circuit through the coin reject solenoid 490, thus de-energizing it and directing subsequent coins to the return coin chute. When the main circuit is energized the power relay solenoid 526 will be energized, thus closing the power relay switch 264, which energizes the cooking circuit. All of the switches and solenoids discussed throughout this description are identified by the same numerals in the wiring diagram. It is believed that the operation of the machine can best be described by reference to the wiring diagram, but having in mind the physical embodiments of the various devices as heretofore described.

It will have been observed that there are numerous individual circuits in the wiring diagram of Fig. 28. Some of these circuits are included in that portion of the diagram indicated at A. The circuits included in the rectifier are indicated at B and those in the cooker at C. Each of these individual circuits will now be traced in order that a more clear understanding as to the operation may be had. It will be understood that in tracing the circuits, the fact that the circuits have been traced from a source of positive potential to a source of negative potential does not necessarily mean that the electricity actually flows from positive to negative, but is to be construed merely as a conventional way of describing the circuits.

In the first circuit current is supplied from a positive source of potential and passes through one side of the line at 528. From the side 528 it passes through the conductor $a$, through the door switch 466, then through the conductor $b$ to the coin switch 498. From the coin switch the current passes through the conductor $c$ to the coin reject solenoid 490. From the coin reject solenoid, through the conductor $d$ it passes to the first empty lock switch 434. From this first empty lock switch the current passes through the conductor $e$ to the next switch 534 and from there through the conductor $f$, through the last switch 634 and through the conductor $g$ to the other side of the line 530, which is supplied by a negative source of potential. This is the circuit which is energized when the machine is fully loaded and is idle.

We shall now consider the other circuits in diagram A when the machine is in operation. It has been previously noted that when the machine is operated the coin switch 498 and the master switch 366 are closed. In this second circuit the current will flow from a positive source of potential through line 528 through the conductor $a$, the door switch 466, the conductor $b$, the coin switch 498 and from there through the conductor $h$, through the master switch 366 and the conductor $i$. The current then flows through the conductor $j$ to the holding solenoid 272 and from there through the conductors $k$ and $l$ to the negative side of the line 530.

In the third circuit the current will flow from a positive source of potential through line 528, conductor $a$, the door switch 466, conductor $b$, coin switch 498, conductor $h$, master switch 366, conductor $i$ and from there through conductor $m$ and the door lock solenoid 442, to the conductors $k$ and $l$ and to the negative source of potential through line 530.

In the fourth circuit the current will flow in the same manner as in the second and third circuits, through the conductor $i$, but from there it will flow through conductor $n$ to the full stroke switch 386, from the full stroke switch through conductor $o$ to the motor 130, and from the motor to the lines $k$ and $l$, to the negative source of potential through line 530.

In the fifth circuit the current will flow from the positive source of potential through the conductor $i$, but from there it will flow directly through the power relay solenoid 526, and from this power relay solenoid through a conductor $p$, to the conductors $k$ and $l$, to the negative side of the line 530.

It will be remembered that one of the push-buttons 10, 12 or 14 will close one of the switches 354, 356 or 358, in order to cause operation of the machine, so that the next circuit to trace will be energized when the clutch and ejector switch 400 is closed. In tracing this circuit, again current will flow from the positive source of potential through the line 528 and from there through the conductor $a$, door switch 466, conductor $b$, coin switch 498, conductor $h$, master switch 366, and conductor $i$. From the conductor $i$ current will then flow through the conductor $q$, through the clutch and ejector switch 400; from this last named switch through a conductor $r$ and thence through one of the conductors $s$, $t$ or $u$, depending upon whether the push-button 14, 12 or 10 has been closed. In this circuit, which we may call the sixth of the circuits, the current will flow in any event through the conductor $r$. If push-button 14 is actuated to close switch 358 the current then passes through the conductor $s$, the switch 435 and conductor $v$. From the conductor $v$ the current will flow through the clutch solenoid and the ejector solenoid No. 3, which are in turn directly connected to the negative source of potential through line 530. Likewise, if the push-button 12 is actuated to close switch 356 the current will then flow from the conductor $r$, through switch 356 and conductor $t$, through the clutch and ejector solenoids No. 2 to the negative source of potential through line 530. Finally, if push-button 10 is actuated then the current flows from conductor $r$ through switch 354, through conductor $u$ to the clutch and ejector solenoids No. 1 and from there to the negative source of potential through line 530.

In this sixth circuit it should also be considered how the current flows in the event that the empty lock switch 435 has been actuated by reason of the third stack being empty, so that the fourth stack will be operated. In this event current will flow, as stated above, from a positive source of potential, through the various conductors $a$, $b$, $h$, $i$, $q$ and $r$, through switch 358 and through conductor $s$. From conductor $s$, however, the current will flow through the switch 435 and through conductor $w$, through switch 437, through conductor $x$ to the clutch and ejector solenoids No. 4 and from there to the negative source of potential through line 530. If, however, the fourth stack is also empty, then the current will flow from conductor $r$ through switch 358, through conductor $s$ to switch 435, through conductor $w$ to switch 437 and then through conductor $y$ to the clutch and ejector solenoids No. 5, which are in turn connected to the negative side of the line 530. If stack No. 5 is empty, then switch 634 of the first circuit traced above will be open and thereby de-energize the coin reject solenoid to prevent subsequent coins from closing the coin switch.

The seventh circuit is energized just before the cycle of the machine is completed, at which time the reset switch 394 will close. In this circuit current flows from a positive source of potential through the line 528, from the line 528 through conductor $z$ to the reset solenoid 512. From the reset solenoid current flows through the conductor *aa* to the reset switch 394 and through conductor *bb* to the conductors *k* and *l*, to the negative source of potential, through line 530. When this circuit is energized the reset solenoid opens the coin switch to close the first circuit, but opens the second, third and fifth circuits. The fourth circuit, through the motor 130, has previously been de-energized by movement of the arm of the full stroke switch 386, from the contact 388 to contact 390.

This constitutes the eighth circuit wherein current flows from a source of positive potential through line 528 and through conductor *cc* to the full stroke switch 386. From this switch the current then passes through the conductor *o* to the motor 130 and from there through the conductors *k* and *l* to the negative source of potential through the line 530.

It was stated heretofore that the filaments of the rectifier and oscillator tubes were constantly energized. The circuits of the rectifier and cooker units indicated at B and C in Fig. 28 will now be traced. Before operation of the machine current is flowing from a positive source of potential through line 528, through conductor *dd* connected at one side of the primary coil of the filament transformer 244. The other side of the primary is connected to the conductor *ee* which carries the current to a negative source of potential, through the line 530. We may identify this circuit as the ninth circuit.

In the tenth circuit current flows from a positive source of potential through line 528 and from there through conductor *ff* to one side of the primary of the filament transformer 252. The other side of the primary of this transformer is connected directly to line 530, where the current is carried to the negative source of potential.

When current is thus induced in the secondary of the filament transformer 244 current then flows through conductor *gg* and from there through conductor *hh* to one side of the filament in one rectifier tube 246. The current then passes through the filament and through the conductor *ii* and thence to conductor *jj* back to the other side of the secondary. At the same time current also flows from the secondary through the conductor *gg* and through conductor *kk* at one side of the filament in the other rectifier tube 246. The current from this filament then passes through the conductor *ll* and through conductor *jj* to the other side of the secondary of the transformer 244; thus, it will be seen that the two filaments are always energized.

Current also flows in a similar manner from the secondary of the transformer 252. From one side of this secondary the current flows through the conductor *mm* to the conductor *nn*, to one side of the filament in the oscillator tube 212. The current then flows from the other side of the filament through conductors *oo* and *pp*, back to the other side of the secondary. At the same time current flows through the conductor *mm* and through conductor *qq* to one side of the filament in the oscillator tube 216. From the other side of this filament the current flows through conductors *rr* and *pp* back to the other side of the secondary of the transformer 252, thus energizing the two filaments of the oscillator tubes.

The machine is now in operation and the circuits to now be traced are not really electric circuits, but rather electron circuits. The operation of such a tuned-plate tuned-grid circuit is well known to those skilled in the art, however it may be well to give a very brief description thereof at this time.

Current passing through the primary of the plate transformer 256 charges the plates of the rectifier tubes 246 alternately with a high positive potential. When the filaments in these tubes are heated they discharge electrons to the positively charged plates therein. These electrons pass through the line 258 to the secondary of the filament transformer 252 through line *vv* and then through the line *mm*. Some of these electrons then go to the filament of the oscillator tube 212 through the line *nn* and others to the filament of the oscillator tube 216 through the line *qq*. The circuit of these electrons is then across to the plates of the oscillator tubes, through the lines *ww* and *xx* to the radio frequency choke 240, thence through the line 238 to the secondary of the filament transformer 244, and then to the respective filaments of the rectifier tubes, through lines *gg* and *hh* to one tube and lines *gg* and *kk* to the other tube. This is called the plate circuit.

When the machine first starts the plates in the oscillator tubes are not charged, but some electrons will nevertheless reach the plates. The first group of electrons to reach the plate, for example in the tube 212, will set up a disturbance in the line *ww* and cooking coil 224, which is fed back to the grid coil 232. This excitation of the grid allows more electrons to reach the plate at the next instant which sets up a greater disturbance and is again fed back to the grid coil. This is repeated until the saturation point is reached. The same thing happens in the tube 216 and line *xx* at alternate moments. The grid and plate circuits are tuned so that the result is a high frequency oscillation.

While the radio frequency choke does not prevent passage of electrons therethrough, it does confine the disturbances to the cooking coil.

In the grid circuit for tube 212, the electrons travel from the grid coil 232 through grid resistor 250, line 248, line *vv* to the secondary of the filament transformer 252, and thence through lines *mm* and *nn* back to the filament. In tube 216 the electrons follow the same path to line *mm*, but then go through line *qq* back to the filament.

The heat in the food article arises because the electrons therein are alternately attracted and repelled at high frequencies by the electronic disturbances in the cooking coil. This alternate attraction and repulsion of the electrons in the food article may be said to be "induced" by the high frequency oscillations. Hence, it may be said that the cooking is performed by "high frequency induction."

*Operation*

Assuming that the machine is fully loaded and it is desired to receive a cooked frankfurter sandwich located for example, in stack No. 3; upon depositing an acceptable coin of proper denomination, the coin switch 498 will be closed to the main circuit thereupon de-energizing the coin reject solenoid 496, so that a second coin deposited before the machine cycles will be returned. In order to remove a sandwich from stack No. 3 it is necessary to actuate push-button 14. When this is done the switch 350 will first be closed, thereby preventing actuation of the other push-buttons and immediately selecting stack No. 3. By means of the mechanical connection or holding bar 276 between the push-button and the master switch 366, this master switch will then be closed, immediately energizing the holding solenoid 272 and retaining the holding bar in elevated position. This maintains the switch 358 in closed position so that when the clutch and ejector switch is closed the clutch and ejector solenoids of the selected stack will be energized. At this same moment the door lock solenoid 442 will be energized, thus preventing the door 18 from being opened. Also at this same moment the motor will start, because the full stroke switch 386 is closed across the main circuit. The power relay solenoid 526 will also be energized at this time, thus closing the power relay switch 264. The closing of this last named switch immediately energizes the rectifier circuit which supplies electrons to the filaments of the oscillator tubes and cooks the food articles by high frequency induction.

Immediately after the above takes place the clutch and ejector switch 400 will be closed momentarily, thus energizing the clutch and ejector solenoids of stack No. 3. At substantially the same time that this happens the contact arm of the full stroke switch 386 will have been moved from the contact 388 to the contact 390, thus connecting the motor directly across the lines 528 and 530. At this point, then, the sandwich has been ejected from the selected stack and deposited in the cooking coil where the cooking operation is taking place. By energization of the selected clutch solenoid, that particular stack is now advancing the next successive sandwich to a position where it may be ejected. The advancing will take place as long as the motor is running. The motor then continues to run, assuming that there is no power failure, until the reset switch 394 is closed by its respective cam element. As soon as this switch closes it will energize the reset solenoid 512, which will mechanically return the coin switch to normal position, opening the main circuit and energizing the coin reject solenoid. As soon as the coin switch is opened the main circuit is dead. However, the motor continues to run until the cam element of the full stroke switch moves its spring arm back to the first contact 388. This connects the motor into the main circuit, which by now has been de-energized by opening the coin switch, and the motor will stop. As soon as the main circuit is de-energized the holding solenoid, the door lock solenoid and the power relay solenoid will be de-energized. The holding solenoid will release the holding bar 276 to return the push-button to its normal position and open the master switch. As soon as the door lock solenoid is de-energized the door 18 may be opened, which will remove the cooked sandwich from the cooking coil and deposit it in the door from which it may be removed by the customer. When the power relay solenoid is de-energized the power relay switch will be open, thus de-energizing the cooking circuit and all of the various devices will then be in their normal position, as shown in the wiring diagram.

It will be evident that if there is a power failure the holding, door lock, and power relay solenoids will all be immediately de-energized, thus turning off the cooking coil, opening the master switch and permitting the door to be opened; the coin switch, however, will still be closed. When the power is resumed, the motor will again start because it has been connected directly across the lines 528 and 530. The motor will then continue to rotate the various cam elements and complete the cycle of the machine.

A momentary power failure will cause holding solenoid on push button assembly to drop out. Thus on the power supply being renewed the motor will return the cams to normal position and the stack to normal position without re-energizing cooker. This protects the tubes in case of power failures of a few seconds in which the rectifier tube filaments have a chance to cool and allow ion bombardment of filament to occur.

If, as we have assumed, stack No. 3 is selected, but is empty, stack No. 4 will be loaded with the same merchandise. Since the empty lock 435 at the top of stack No. 3 is of the double pole type, the testing finger will have closed the circuit through the clutch and ejector solenoids of stack No. 4, and the desired article of food will be cooked and dispensed.

From the foregoing description it will be evident that we have provided novel mechanism for carrying out the objects stated. It will be clear also that, while we have certain high frequencies which we prefer to use, there may be others equally applicable within certain limits. We have found that the use of frequencies within the range of 70 to 100 megacycles are particularly well adapted for our purposes. In some cases it will be understood that lower or higher frequencies may be used.

In machines of this type time is of the utmost importance and it is necessary that the various operations be carried out as quickly as possible. If, on the other hand, the machine were to be adapted for cooking articles of food other than frankfurters, it may be necessary or desirable to use frequencies either higher or lower than those mentioned herein but still sufficiently high to have a heating effect on the food product.

It should be further observed that while we have indicated the use of five storage magazines, any number may be used, as desired. It should also be noted that the various switches and solenoids used herein can be connected together in ways other than that shown in the wiring diagram of Fig. 28; this wiring diagram being merely illustrative of the embodiment of the invention disclosed herein.

One of the features of the invention is the construction whereby the storage magazines and the cooking unit are both readily accessible. This is accomplished either by mounting the cooking unit on the back of the door, as already shown and described, or by mounting it on an auxiliary door adapted to be swung open away from the front of the storage magazines. The accessible feature is also made possible by disposing the mechanism for advancing the stacks in the lower part of the cabinet.

It will be understood that certain changes may be made in the apparatus described without departing from the invention; for example, although it is preferable to employ a cooking coil it is also possible under some circumstances to use a series of plates surrounding the object to be heated. The cooking coil can have other shapes and the wire in the coil may have the same or a variable pitch. Thus, according to one modification of the invention, the number of turns of wire per unit of distance is increased at both ends of the coil thereby to increase the intensity of the cooking or heating at the ends of the frankfurter. Although it is preferably to employ a pair of oscillator tubes, generally speaking one or more may be used. Instead of two rectifier tubes a greater number of multiples of two may be used.

The word "cooking" is used herein in its commonly accepted meaning to cover the preparation of food for eating by heating it. It will be understood that the food article which is "cooked" need not be raw but may have been previously pre-cooked. In fact, in many instances it is desirable that the food article be pre-cooked.

Having thus described the invention, what we claim as new and desire to secure by Letters Patent of the United States is:

1. In a selective cooking and vending machine, a plurality of stacks of food articles adapted to be cooked and dispensed, a cooking unit, means for selecting one of said stacks to be operated upon, means to deliver a food article from the selected stack to said cooking unit, and means for cooking the delivered article.

2. In a selective cooking and vending machine, a plurality of stacks of food articles adapted to be cooked and dispensed, a cooking unit laterally disposed with respect to said stacks, means for selecting one of said stacks to be operated upon, means to deliver a food article from the selected stack to said cooking unit, and means for cooking the delivered article.

3. In a selective cooking and vending machine, a plurality of stacks of food articles adapted to be cooked and dispensed, each of said stacks comprising a plurality of superposed supports for the food articles, a cooking unit, means for selecting one of said stacks to be operated upon, means for positively removing a food article from the selected stack and depositing it in the cooking unit, and means for cooking the deposited article.

4. In a selective cooking and vending machine, a plurality of stacks of food articles adapted to be cooked and dispensed, a cooking unit having a vertically disposed chamber to receive one of said food articles, means for selecting one of said stacks to be operated upon, means to deliver a food article from the selected stack to said vertical chamber of the cooking unit, and means for cooking the delivered article.

5. In a selective cooking and vending machine, a plurality of stacks of food articles adapted to be cooked and dispensed, a cooking unit, means for selecting one of said stacks to be operated upon, means for removing a food article from the top of the selected stack and delivering it to said cooking unit, and means for cooking the delivered article.

6. In a selective cooking and vending machine, a plurality of stacks of food articles adapted to be cooked and dispensed, a cooking unit, means for selecting one of said stacks to be operated upon, removing means for removing a food article from a selected stack at a predetermined location therein and delivering it to said cooking unit, means for cooking the delivered article, and means to advance the selected stack to bring the next successive food article into a position to be acted upon by the removing means.

7. In a selective cooking and vending machine, a plurality of stacks of food articles adapted to be cooked and dispensed, a cooking unit, means for selecting one of said stacks to be operated upon, means to deliver a food article from the selected stack to said cooking unit, and means for cooking the delivered article by high frequency induction.

8. In an electric selective cooking and vending machine, a plurality of stacks of food articles adapted to be cooked and dispensed, a cooking unit, means for selecting one of said stacks to be operated upon, means controlled by an electric circuit to deliver a food article from the selected stack to said cooking unit, and means for cooking the delivered article.

9. In an electric selective cooking and vending machine, a plurality of stacks of food articles adapted to be cooked and dispensed, a cooking unit, means controlled by an electric circuit for selecting one of said stacks to be operated upon, means to deliver a food article from the selected stack to said cooking unit, and means for cooking the delivered article.

10. In an electric selective cooking and vending machine, a plurality of stacks of food articles adapted to be cooked and dispensed, a cooking unit, means controlled by an electric circuit for selecting one of said stacks to be operated upon, means also controlled by an electric circuit to deliver a food article from the selected stack to said cooking unit, and means for cooking the delivered article by high frequency induction.

11. In an electric selective cooking and vending machine, a plurality of stacks of food articles adapted to be cooked and dispensed, a cooking unit, means for selecting one of said stacks to be operated upon, delivery means to deliver a food article from the selected stack to said cooking unit, means for cooking said article, and means controlled by an electric circuit to advance the selected stack to bring the next successive food article therein to a position where it can be acted upon by said delivery means.

12. In a selective cooking and vending machine, a plurality of stacks of food articles adapted to be cooked and dispensed, a cooking unit, means for selecting one of said stacks to be operated upon, means to deliver a food article from the selected stack to said cooking unit, means for cooking the delivered article, and means for removing said food article from the cooking unit after the cooking operation.

13. In a selective cooking and vending machine, a plurality of stacks of food articles adapted to be cooked and dispensed, a cooking unit, means for selecting one of said stacks to be operated upon, means to deliver a food article from the selected stack to said cooking unit, means for cooking the delivered article, and means for preventing removal of said food article from the cooking unit until after the cooking operation.

14. A selective cooking and vending machine, comprising a cabinet having a door thereon, a plurality of stacks of food articles adapted to be cooked and dispensed located within said cabinet, a cooking unit located on the inside of said door, means for selecting one of said stacks to be operated upon, means to deliver a food article from the selected stack to said cooking unit, and means for cooking the delivered article.

15. A selective cooking and vending machine, comprising a cabinet having a door thereon, a plurality of stacks of food articles adapted to be cooked and dispensed located within said cabinet, each of said stacks including a plurality of superposed horizontal shelves on which the food articles are located, a cooking unit mounted on the inside of the door, means for selecting one of said stacks to be operated upon, means for positively removing a food article from the selected stack and delivering it to the cooking unit, means for cooking the delivered article, and means for advancing the selected stack to bring the next successive food article to a position to be acted upon by said removing means.

16. A selective cooking and vending machine, comprising a cabinet having a door thereon, a plurality of stacks of food articles adapted to be cooked and dispensed located within said cabinet, each of said stacks including a plurality of superposed horizontal shelves on which the food articles are located, a cooking unit mounted on the inside of the door, a vertically disposed chamber in said cooking unit to receive a food article, means for selecting one of said stacks to be operated upon, means for removing a food article from the selected stack at a predetermined location therein at a level above the vertically disposed chamber and delivering it laterally and downwardly to the top of said vertically disposed chamber, and means for cooking the delivered article.

17. A selective cooking and vending machine, comprising a cabinet having a door thereon, a plurality of stacks of food articles adapted to be cooked and dispensed located within said cabinet, each of said stacks including a plurality of superposed horizontal shelves on which the food articles are located, a cooking unit mounted on the inside of the door, a vertically disposed chamber in said cooking unit to receive a food article, means for selecting one of said stacks to be operated upon, means for removing a food article from the topmost shelf of the selected stack and delivering it to said vertically disposed chamber, means for cooking the delivered article, and means for preventing removal of the food article from said chamber until the cooking operation has been completed.

18. In a cooking and vending machine wherein a plurality of food articles adapted to be cooked and dispensed are contained within a cabinet having a door thereon, a cooking unit located on the inside of the door, means to deliver a food article to said cooking unit, and means for cooking the delivered article.

19. In a cooking and vending machine wherein food articles adapted to be cooked and dispensed are located within a cabinet, a cooking unit, means to deliver a food article to said cooking unit, means for cooking the delivered article, a normally closed door in said cabinet having a chamber attached thereto, and means connected to said door for removing the cooked article from the cooking unit and depositing it within the chamber when the door is opened.

20. In a cooking and vending machine wherein food articles adapted to be cooked and dispensed are located within a cabinet, a cooking unit, means to deliver a food article to said cooking unit, means for cooking the delivered article, a normally closed door in said cabinet having a chamber attached thereto, means connected to said door for removing the cooked article from the cooking unit and depositing it within the chamber when the door is opened, and means for holding the door in closed position until after the cooking operation.

21. In an electric cooking and vending machine wherein a plurality of food articles are adapted to be cooked and dispensed, a cooking unit, means for delivering a food article to said cooking unit, means for cooking said food article, and means controlled by an electric circuit to insure a complete cycling of the machine in the event of momentary power failure.

22. In an electric cooking and vending machine having a cabinet with a plurality of food articles within said cabinet adapted to be cooked and dispensed, a cooking unit, means for delivering a food article to said cooking unit, means for cooking said food article, an electric circuit, means controlled by said electric circuit for operating said cooking means, a door on said cabinet for removing said food article from said cooking unit, and a switch in said circuit movable to open position when said door is open, to thereby prevent operation of said cooking means when said door is open.

23. In an electric cooking and vending machine having a cabinet with a plurality of food articles within said cabinet adapted to be cooked and dispensed, a cooking unit, means for delivering a food article to said cooking unit, means for cooking said food article, an electric circuit, means controlled by said electric circuit for operating said cooking means, a door on said cabinet for removing said food article from said cooking unit, a switch in said circuit movable to open position when said door is open, to thereby prevent operation of said cooking means when said door is open, and means controlled by said electric circuit to prevent said door from being opened during the cooking operation.

24. In an electric cooking and vending machine wherein a plurality of food articles are adapted to be cooked and dispensed, a cooking unit, a normally open electric circuit, means for closing said circuit, means actuated upon the closing of said electric circuit to deliver a food article to said cooking unit, a second normally open electric circuit, means in said second electric circuit to cook said food article, and means actuated upon the closing of the first circuit to close said second circuit, to thereby energize said cooking means.

25. In an electric cooking and vending machine wherein a plurality of food articles are adapted to be cooked and dispensed, a cooking unit having a helical cooking coil therein disposed laterally and generally vertically with respect to said food articles, means to deliver a food article to within said cooking coil, and means controlled by an electric circuit to cook said food article by high frequency induction.

26. In a coin operated electric selective cooking and vending machine, a plurality of stacks of food articles adapted to be cooked and dispensed, means to select one of said stacks to be operated upon, a cooking unit, a normally open electric circuit, means actuated by a deposited coin for closing a part of said circuit, means for closing the remainder of said circuit, means actuated by the closing of the remainder of said circuit to deliver a food article from the selected stack to said cooking unit, and means for cooking the delivered article.

27. In a coin operated electric cooking and vending machine, a plurality of stacks of food articles adapted to be cooked and dispensed, a cooking unit, means controlled by an electric circuit to deliver a food article from one of the stacks to said cooking unit upon depositing a coin, means for cooking said food article, and means associated with each stack adapted to cause delivery of a food article to the cooking unit from another stack when the food articles in the previous stack operated upon have been exhausted.

28. In a machine of the class described, a cooking unit, means for cooking a food article in said unit, means for removing a food article from said cooking unit, and means controlled by an electric circuit to cause removal of said food article from said cooking unit in the event of momentary power failure but without re-energizing said cooking unit.

ERNEST H. THOMPSON.
ROBERT W. LOCKHART.
ERNEST L. WOLF.